United States Patent [19]
Thompson

[11] Patent Number: 5,881,245
[45] Date of Patent: Mar. 9, 1999

[54] METHOD AND APPARATUS FOR TRANSMITTING MPEG DATA AT AN ADAPTIVE DATA RATE

[75] Inventor: Kenneth M. Thompson, Altanta, Ga.

[73] Assignee: Digital Video Systems, Inc., Los Gatos, Calif.

[21] Appl. No.: 711,827

[22] Filed: Sep. 10, 1996

[51] Int. Cl.$^6$ ........................................ H04N 7/16
[52] U.S. Cl. .................. 395/200.49; 348/12; 455/5.1
[58] Field of Search ......................... 348/419, 423, 348/500, 6, 7, 12; 370/412, 545, 230; 455/6.1, 3.1, 4.1, 5.1, 4.2; 395/200.49, 200.48, 200.47

[56] References Cited

U.S. PATENT DOCUMENTS

| | | |
|---|---|---|
| 5,543,853 | 8/1996 | Haskell et al. ........................... 348/419 |
| 5,566,208 | 10/1996 | Balakrishnan ........................... 348/419 |
| 5,586,264 | 12/1996 | Belknap et al. ............................ 348/7 |
| 5,598,213 | 1/1997 | Chung et al. ............................. 348/419 |
| 5,677,969 | 10/1997 | Auyeung et al. ......................... 348/419 |
| 5,720,037 | 2/1998 | Biliris et al. .................................. 348/6 |

*Primary Examiner*—Nathan Flynn
*Attorney, Agent, or Firm*—Sawyer & Associates

[57] ABSTRACT

A method and device for communicating encoded data (such as MPEG encoded data for example) from a server to a decoder via a buffer. The rate at which the server provides the encoded data are adjusted based on a state of the buffer such that the buffer does not overflow or run dry, even when the communication of the data is subject to drift. Specifically, when the buffer is below a predetermined level, the rate at which the server provides the encoded data is increased. On the other hand, when the buffer is above a predetermined level, the rate at which the server provides the encoded data is decreased.

16 Claims, 17 Drawing Sheets

| State | Rate Adjustment | Weight |
|---|---|---|
| Empty* | W1= | 0.900 |
| Low | W2= | 0.950 |
| Medium | W3= | 0.985 |
| High | W4= | 1.005 |
| Overflow** | W5= | 1.050 |

\* Assumed to exist during start-up or error recovery

\*\* Fail Write

FIG. 14

METHOD AND APPARATUS FOR TRANSMITTING MPEG DATA AT AN ADAPTIVE DATA RATE

BACKGROUND OF THE INVENTION a. Field of the Invention

The present invention concerns the communication, or distribution, of encoded data, such as MPEG (i.e., Motion Pictures Expert Group) or MPEG-2 encoded video data for example, from a server (such as an MPEG transport stream server for example) to one or more decoders.

b. Related Art

The MPEG-2 standard focuses on the encoding and transport of video and audio data. In general, the MPEG-2 standard uses compression algorithms such that video and audio data may be more efficiently stored and communicated.

The International Organisation for Standardisation (or the Organisation Internationale De Normalisation) (hereinafter referred to as "the ISO/IEC") has produced drafts of the MPEG-2 standard for the coding of moving pictures and associated audio. This standard is set forth in four documents. The document ISO/IEC 13818-1 (systems) specifies the system coding of the specification. It defines a multiplexed structure for combining audio and video data and means of representing the timing information needed to replay synchronized audio and video sequences in real-time. The document ISO/IEC 13818-2 (video) specifies the coded representation of video data and the decoding process required to reconstruct pictures. The document ISO/IEC 13818-3 (audio) specifies the coded representation of audio data and the decoding process required to reconstruct the audio data. Lastly, the document ISO/IEC 13818-4 (conformance) specifies procedures for determining the characteristics of coded bitstreams and for testing compliance with the requirements set forth in the ISO/IEC documents 13818-1, 13818-2, and 13818-3. These four documents, hereinafter referred to, collectively, as "the MPEG-2 standard" or simply "the MPEG standard", are incorporated herein by reference.

A bit stream, multiplexed in accordance with the MPEG-2 standard, is either a "transport stream" or a "program stream". Both program and transport streams are constructed from "packetized elementary stream" (or PES) packets and packets containing other necessary information. A "packetized elementary stream" (or PES) packet is a data structure used to carry "elementary stream data". An "elementary stream" is a generic term for one of (a) coded video, (b) coded audio, or (c) other coded bit streams carried in a sequence of PES packets with one and only stream identifier (or "ID"). Both program and transport streams support multiplexing of video and audio compressed streams from one program with a common time base.

Transport streams permit one or more programs with one or more independent time bases to be combined into a single stream. Transport streams are useful in instances where data storage and/or transport means are lossy or noisy. The rate of transport streams, and their constituent packetized elementary streams (PESs) may be fixed or variable. This rate is defined by values and locations of program clock reference (or PCR) fields within the transport stream.

FIG. 1 illustrates the packetizing of compressed video data 106 of a video sequence 102 into a stream of PES packets 108, and then, into a stream of transport stream packets 112. Specifically, a video sequence 102 includes various headers 104 and associated compressed video data 106. The video sequence 102 is parsed into variable length segments, each having an associated PES packet header 110 to form a PES packet stream 108. The PES packet stream 108 is then parsed into segments, each of which is provided with a transport stream header 114 to form a transport stream 112. Each transport stream packet of the transport stream 112 is 188 bytes in length.

Although the syntax of the transport stream 112 and transport stream packets is described in the MPEG-2 standard, the fields of the transport stream packet pertaining to the present invention will be described below with reference to FIG. 2 for the reader's convenience. As shown in FIG. 2, a transport stream 112 includes one or more 188 byte transport stream packets 200, each of the transport stream packets 200 having a header 114 and an associated payload 216.

Each header 114 includes an eight (8) bit synch byte field 218 and a packet identification (or PID) field 220. The synch byte field 218 has a value of "01000111" (or 47 hex) and identifies the start of a 188 byte transport stream packet 200. The PID field 220 indicates the type of data (e.g., audio, video, secondary audio program (or "SAP"), private, etc.) stored in the payload 216 of the 188 byte transport stream packet. Certain PID values are reserved.

The payloads 216 of one or more transport stream packets 200 may carry "packetized elementary stream" (or PES) packets 300. To reiterate, a "packetized elementary stream" (or PES) packet 300 is a data structure used to carry "elementary stream data" and an "elementary stream" is a generic term for one of (a) coded video, (b) coded audio, or (c) other coded bit streams carried in a sequence of PES packets with one and only stream ID.

FIG. 3 is a diagram which illustrates the syntax of a PES packet 300. As FIG. 3 shows, a PES packet 300 includes a 24 bit start code prefix field 302, an eight (8) bit stream identifier field 304, a sixteen (16) bit PES packet length field 306, an optional PES header 308, and a payload section 106. Each of these fields is described in the MPEG-2 standard. However, for the reader's convenience, the fields particularly relevant to the present invention are described below.

The sixteen (16) bit PES packet length field 306 specifies the number of bytes in the PES packet 300 following this field 306. A value of 0 in this field 306 indicates that the PES packet length is neither specified nor bounded. Such an unspecified and unbounded PES packet 00 is only allowed in PES packets whose payload is a video elementary stream contained in transport stream packets. As can be deduced from the description of the PES packet length field 306, the PES packet 300 can be much longer (e.g., 4000 bytes) than the length of the payload 216 of a 188 byte transport stream packet. Thus, as shown in FIG. 1, a PES packet 300 is typically carried in consecutive payloads 216 of a series of transport stream packets. The payload 106 of a PES packet 300 may carry a sequence of video frames or audio frames, for example.

FIG. 4 is a high level block schematic showing a system 400 for communicating and decoding video and audio data in accordance with the MPEG-2 standard. This system 400 basically includes a MPEG stream server 402 which provides data to an MPEG decoder 404 via a communications link 406.

The MPEG stream server 402 includes a storage system 408, a timing and control unit 410, a transfer buffer 412, and an interface unit 414. The storage system 408 stores files of packetized encoded data, such as PES or transport stream packets of MPEG data for example. The encoded data has been encoded, by an MPEG encoder for example, at an encoder rate. The storage system 408 may include a disk or array of disks which are well-known in the art. The timing and control unit 410 controls a reading out of one or more files stored in the storage systems 408 based on a clock signal CLK. The files of packetized encoded data read out from the storage system 408 are buffered in the transfer buffer 412. Under the control of the timing and control unit 410, the interface unit 414 provides data, stored in the transfer buffer 412, to the communications link 406. The interface unit 414 multiplexes packets of encoded audio and video data to form a program stream or a transport stream 112. The control signals provided by the timing and control unit 410 to the interface unit 414 may be based on the clock signal CLK or may be based on an independent clock signal.

At a remote end of the communications link 406, the MPEG decoder 404 includes a transport stream demultiplexer 416, a video decoder 418, an audio decoder 420, and clock control unit 422. The transport stream demultiplexer 416 receives the output of the stream server 402 in the form of a transport stream 112. Based on the packet identification (or PID) number 220 of a particular transport stream packet 200, the transport stream demultiplexer 416 separates the encoded audio and video packets and provides the video packets to the video decoder 418 and the audio packets to an audio decoder 420. The transport stream demultiplexer 416 also provides timing information to a clock control unit 422. The clock control unit 422 provides timing signals to both the video decoder 418 and the audio decoder 420 based on the timing information provided by the transport stream demultiplexer 416. The video decoder 418 provides decoded video data which corresponds to the video data originally encoded. Similarly, the audio decoder 420 provides decoded audio data which corresponds to the audio data originally encoded.

In any real-time system utilizing a digital source to derive an analog signal, the requisite number of data bits must be provided to analog generation circuitry in a timely manner so that the analog signal may be generated and transmitted to preserve the real-time characteristics of the system. In the current digital art, each video channel is derived from a single storage medium and a concomitant storage controller. In a system having mismatches in capacity between the digital source and the analog generation circuitry, such as will occur when digital data must be retrieved from local storage and transmitted as a digital stream over a transport medium, the real-time operation is aided by the use of intermediate buffer memory. The buffer memory ensures the requisite bits are available to the analog generation circuitry when needed.

It is important to provide a buffer memory of the proper size. Too little memory will cause lost analog frames, and too much memory is costly. As shown in FIG. 4, encoded data, such as encoded video data for example, may be buffered in the decoder 404 at a point "A" before the transport demultiplexer 416 and/or at a point "B" between the transport demultiplexer 416 and the video decoder 418.

Similarly, decoding encoded data involves the timely delivery of the encoded data (which comprise a video program for example) from a storage system (e.g., server 402) to the decoder 404. Of particular importance to the timely delivery of encoded data are two, sometimes unavoidable characteristics of the delivery process itself; namely "drift" and "jitter".

Drift is a monotonic error in the rate of data transfer from the server 402 to the decoder 404. Drift occurs when, on average, the rate at which a decoder (e.g., video decoder 418) consumes encoded data differs from the rate at which encoded data are provided (e.g., by the transport demultiplexer 416). Drift may cause a decoder buffer to run dry or overflow, particularly during extended transfers of data. If the decoder buffer runs dry, the decoder has no data to decode. Thus, for example, a video decoder would have to display the same frame for two or more consecutive frame periods. If, on the other hand, the decoder buffer overflows, data are lost. Drift is of particular concern when relatively long transfers of encoded data are provided to a relatively small decoder buffer.

Jitter is a random variation in the rate of data transfer from the server to the decoder. Jitter may cause variations in the level of decoder input buffers. However, since jitter tends to average out over time, it typically does not cause a decoder buffer to run dry or overflow.

In the known system 400, the MPEG digital source (i.e., the stream server 402) is the master of downstream circuitry (i.e., the decoder 404). That is, the downstream circuitry must be arranged to process the incoming data bits without the ability to control the rate at which incoming bits arrive. In operation, the MPEG stream server 402 provides the MPEG data to the MPEG decoder 404 (or video decoder 418) at a constant output rate that matches an original MPEG encode rate. This encode rate is either provided by the encoder or may be calculated from the size of the file containing the MPEG data and the number of frames contained within that data file. Thus, in the known system 400, the stream server 402 and the communications link 406 must provide the packets of encoded data at a fixed rate.

Small buffers located at "A" or "B" usually suffice to avoid random variances in the provision of encoded data, due to jitter for example. Unfortunately, even if the MPEG encode rate, the MPEG stream server output rate and the MPEG decoder rate are equal, problems can occur in the system 400 nonetheless, due to data transmission anomalies which alter the data transmission rate. In particular, as discussed above, drift of the transmitted MPEG data may cause the decoder buffers to overflow or run dry, particularly with relatively long transfers and relatively small buffers. Such anomalies obviously impact the overall quality and reliability of transmitted MPEG data and ultimately, viewers of a transmitted program, Although the probability of queue overflow can be reduced by increasing the size of the decoder buffers, this solution increases the cost of the decoder 404. If multiple decoders 404 are needed, this increased memory cost is exacerbated.

An additional transmission-rate related problem which limits the prior art system 400 occurs when different programs are MPEG encoded at different encode rates and then transmitted as concatenated programs. To reiterate, a transport stream 112 may include one or more programs. In particular, video programs which comprise a sequence of video data are MPEG encoded and then stored as files in the storage system 408 of the stream server 402. Due to inherent differences in the video data from one program to another, not all of the programs are MPEG encoded at the same encode rate, however. Thus, during operations of the stream server 402, it may be necessary to transmit a first encoded program at a given rate (the program encode rate) and then transmit another, concatenated program at a different rate. Oftentimes, the stream server 402 cannot compensate for the variations in the transmission rates. This may lead to "garbled" or unintelligible transmissions of encoded data.

In view of the above described problems with known systems 400, a method and apparatus for preventing buffer(s) arranged between a server and a decoder from running dry or overflowing, due to drift for example, while, at the same time, compensating for variations in encoding rates in more than one program, are needed.

SUMMARY OF THE INVENTION

The present invention advantageously compensates for the data transfer rate problems associated with known systems. The present invention does so by providing a control back channel from the decoder and to the stream server.

First, the control back channel of the present invention allows the stream server to compensate for transmission problems such as drift. Further, the control back channel of the present invention automatically compensates for variations in stream rates which occur when programs, which are encoded at different rates, are played consecutively. Finally, the control back channel of the present invention facilitates compensation for rate anomalies due to errors in decoding which may result in short term slow down or speed up of the decoder data consumption.

During operation, any transfer rate adjustments necessitated by transmission anomalies, by successive programs having varying encoding rates, or by decoder anomalies, are all performed upstream of the decoder (e.g., by the stream server) without burdening the decoder. Advantageously, the present invention is applicable to configurations where the decoder and stream server are not directly connected, i.e., when the decoder and stream server communicate over a long-haul network. Moreover, the present invention permits the size of the buffers arranged between the server and the decoder(s) to be minimized.

The method of the present invention accomplishes these goals by (i) transmitting the encoded data from the server to the decoder, via a buffer, at a first rate,(ii) determining a state of the buffer, and (iii) varying the first rate based on the state of the buffer. The step of determining a state of the buffer preferably includes determining whether a level of buffer utilization is above or below a predetermined threshold or "high water mark". In a preferred embodiment of the method of the present invention, this may further involve determining a state of the utilization of the buffer, e.g., high, medium, or low. The buffer utilization can be divided into a greater number of states which permits the rate to be more accurately adjusted but increases processing complexity. The number of buffer utilization states introduces quantization effects.

In a preferred embodiment of the method of the present invention, when the level of buffer utilization is high, the first rate is decreased and when the level of buffer utilization is low, the first rate is increased. When the level of buffer utilization is medium, the first rate is increased, although not to the extent as when the buffer utilization is low. In a preferred embodiment of the method of the present invention, the minimum and maximum rates are bounded.

In a preferred embodiment of the present invention, the encoded data from the server is transmitted to the buffer over a communications channel in accordance with the SCSI-2 fast and wide protocol.

The method of the present invention is preferably employed in a system having a server, up to M*N decoders, each having a decoder buffer memory, and up to M expanders, each having a buffer memory partitioned into up to N queues. In such a system, the method (i) transmits the encoded data from the server to one of the decoders, via one of the expanders associated with the decoder, until its decoder buffer memory is filled to a predetermined level, (ii) transmits, at a first rate, the encoded data from the server to one of the queues of the buffer memory of the expander associated with the decoders, (iii) determines a state of the queue of the buffer memory, and (iv) adjusts the first rate at which the encoded data are transmitted from the server to the queue based on the determined state to form an adjusted rate. The state of the queue may be determined at the expander and transmitted to the server.

In a preferred embodiment of the method of the present invention, if the system is in a start-up or error recovery state, the adjusted rate is limited to a predetermined maximum rate. In the start-up rate, the stream server begins to transmit the encoded data before the scheduled playtime to pre-charge the memories of the proper decoder and the corresponding queue of the buffer memory of the expander.

A system for implementing the method of the present invention includes (i) a server for retrieving files of the encoded data and outputting streams of the encoded data at a determined rate, (ii) an expander having an input receiving the streams of encoded data output by the server, a storage device for buffering the streams of encoded data received at the input of the expander, a first output for providing, upon request, the streams of encoded data buffered in the storage device, and a second output for providing storage device state data to the server, wherein the determined rate of the server is adjusted based on the storage device state data, and (iii) decoders, each of which has an input for receiving the streams of encoded data provided from the first output of the expander and an output for providing data requests to the expander.

The storage device is preferably segmented into a number of queues such that each of the plurality of decoders has an associated queue. In such a case, the stream server directs the streams of the encoded data to a particular queue of the storage device based on which of the decoders the stream is destined for.

In a preferred embodiment of the present invention, the input and second output of the expander share a common port. This common port can be facilitated by a communications channel supporting the SCSI-2 fast and wide protocol.

In a preferred embodiment of the present invention, the expander includes (i) a first interface defining the input of the expander, (ii) an internal bus coupled with the first interface, (iii) a second interface defining the first output of the expander and being coupled with the internal bus, (iv) a first microprocessor, coupled with the internal bus, for moving the streams of encoded data received at the first interface to the storage device and for moving buffered data from the storage device to the second interface, and (v) an arbiter for arbitrating access to the internal bus of the expander. The first microprocessor preferably determines the storage device state data and provides the storage device state data to the first interface via the internal bus.

In a preferred embodiment of the present invention, each of the decoders includes a transport demultiplexer, a first decoder, a first memory device and a second memory device. The transport demultiplexer has an input for accepting the stream of encoded data, and at least two outputs. The transport demultiplexer separates different types of encoded data from the stream of encoded data and provides these different types of encoded data to associated ones of its outputs. The first memory device is associated with the transport demultiplexer and buffers the stream of encoded data. The first decoder has an input coupled with one of the outputs of the transport demultiplexer and decodes the encoded data provided to it. The second memory device is associated with the first decoder and buffers the encoded data provided on the output of the transport demultiplexer. The second memory device is filled with the encoded data provided before the first memory device is filled, to a predetermined level, with the stream of encoded data. A queue of the storage device of the expander is only filled when the first and second memory devices of the decoders are filled to a predetermined level.

In a preferred embodiment of the present invention, the server includes a file storage device, a timing and control unit, a transfer buffer, an interface unit, and a rate adjustment device. The file storage device stores files of the encoded data. The timing and control unit accesses one of the files of the encoded data stored in the file storage device. The transfer buffer buffers the files of encoded data stored on the file storage device and accessed by the timing and control unit. The interface unit formats data buffered in the transfer buffer for output. The timing and control unit selects the determined rate at which data are requested by the interface unit from the transfer buffer. Finally, the rate adjustment device adjusts the determined rate based on the storage device state data.

In an alternative embodiment of the present invention, the expander may include (i) a first interface defining the input of the expander, (ii) an internal bus coupled with the first interface, (iii) a second interface defining the first output of the expander and being coupled with the internal bus, (iv) a first microprocessor, coupled with the internal bus, for moving the streams of encoded data received at the first interface to the storage device and for moving buffered data from the storage device to the second interface, (v) a second microprocessor, coupled with the internal bus, for determining the storage device state data, (vi) a control bus interface coupled with the internal bus, and (vii) an arbiter for arbitrating access to the internal bus of the expander. In this alternative embodiment, the second microprocessor communicates the storage device state data to the stream server via the second output.

BRIEF DESCRIPTION OF THE DRAWINGS

FIG. 14 is a table showing an example of rate weights which may be used with the present invention.

DETAILED DESCRIPTION

Figure 1:
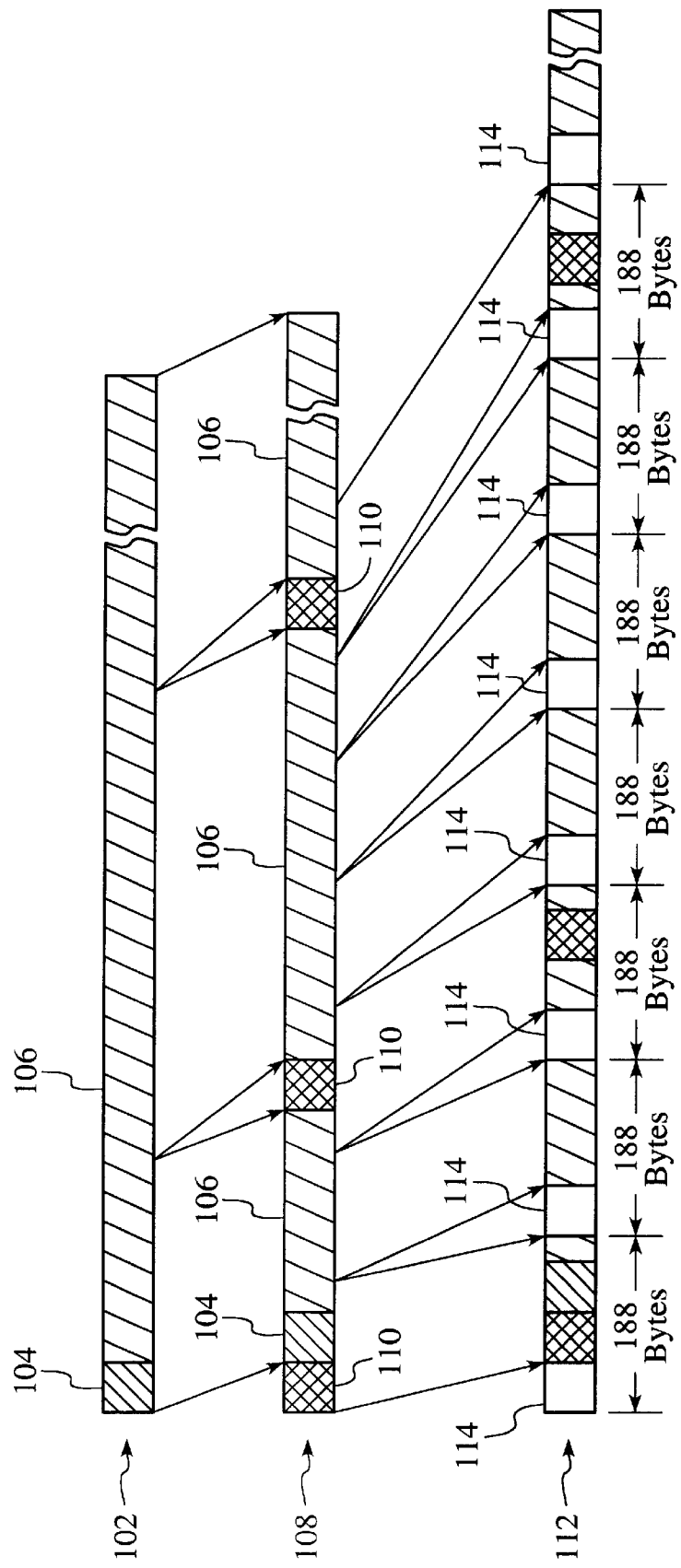
FIG. 1 is a diagram which illustrates the packetizing of encoded data in accordance with the MPEG-2 standard.
Figure 2:
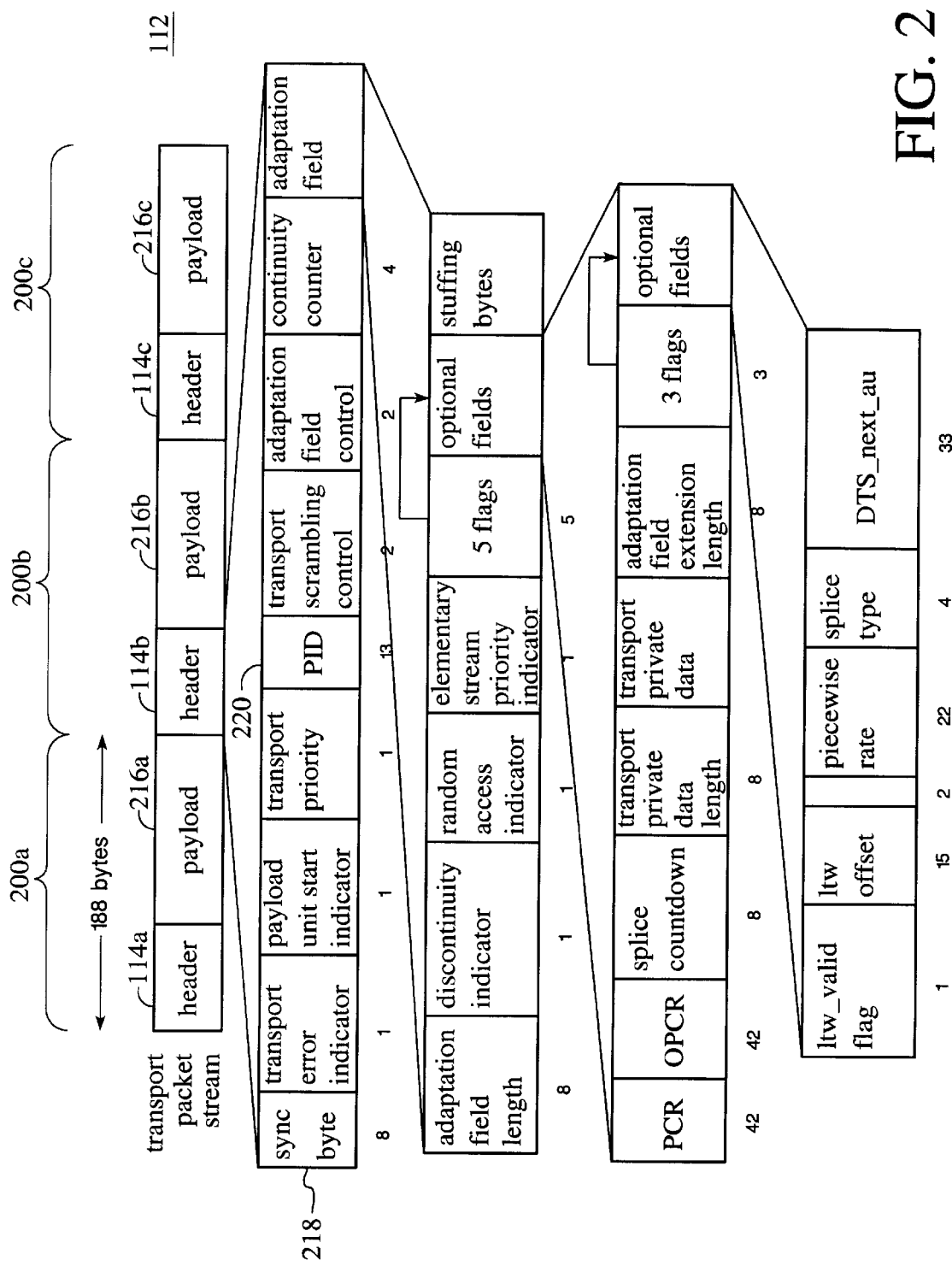
FIG. 2 is a diagram illustrating the syntax of an MPEG-2 transport stream.
Figure 3:
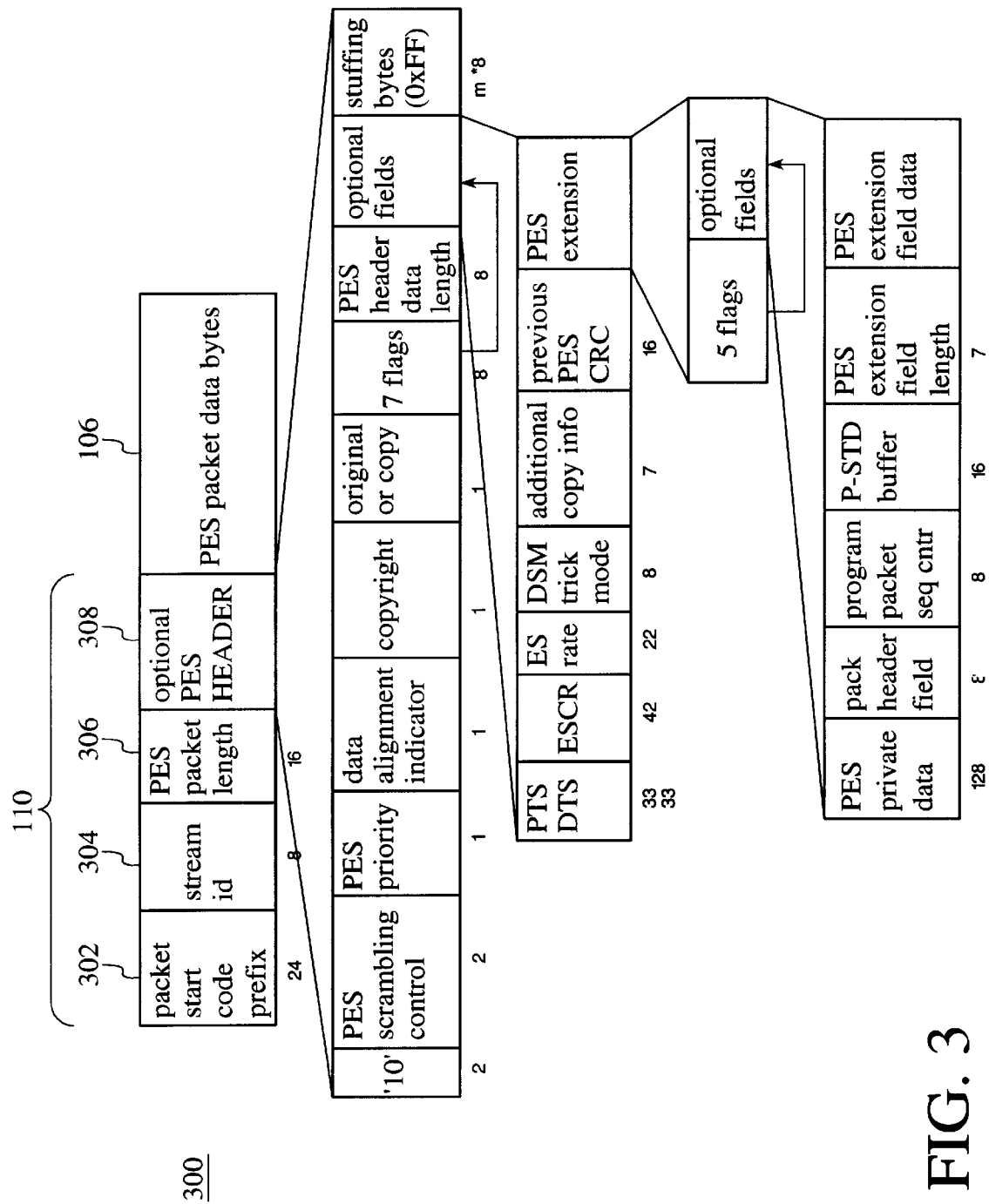
FIG. 3 is a diagram illustrating the syntax of an MPEG-2 PES packet.
Figure 4:
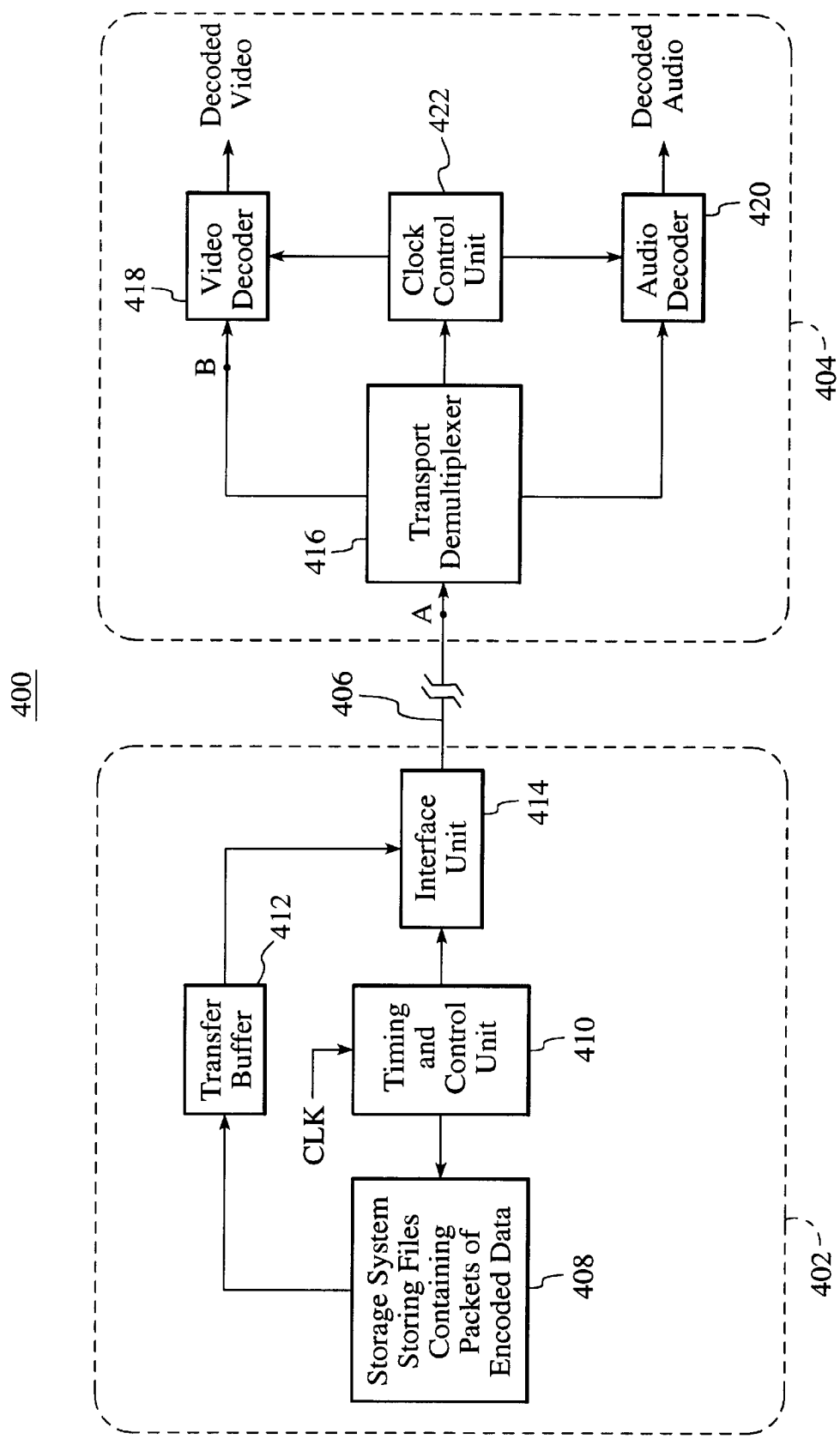
FIG. 4 is a high level block diagram of a known MPEG video delivery system.
Figure 5:
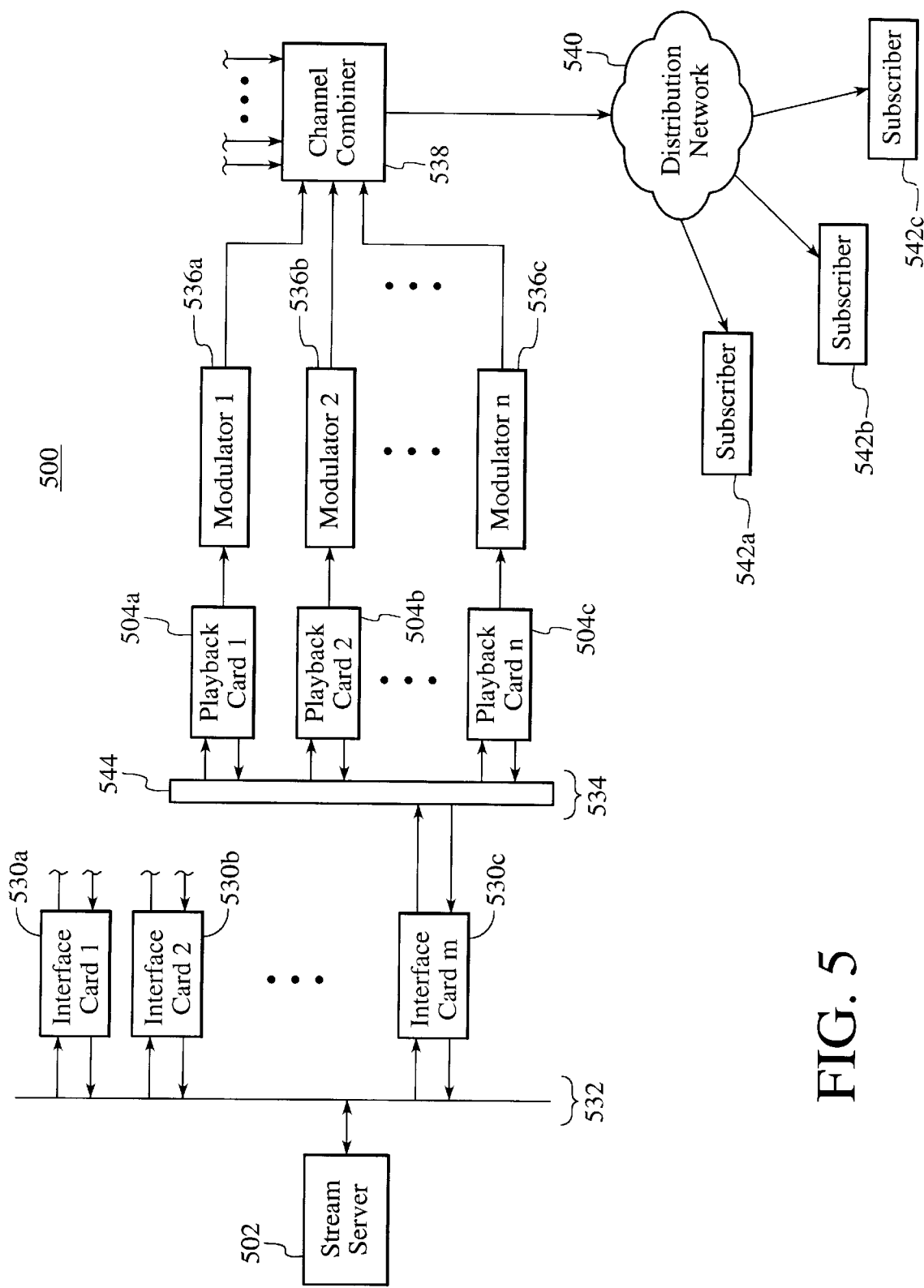
FIG. 5 is a high level block diagram of a system in which the method and device of the present invention may operate.

1. HIGH LEVEL DESCRIPTION OF OUR SYSTEM 1.1 Basic function of the overall system FIG. 5 is a high level block diagram of a system 500 in which the device and method of the present invention may operate. Basically, the system 500 distributes compressed video and audio data from a source to a group of decoders, each decoder being associated with a particular channel of a subscription television service. Each of the decoders provide an analog output. These analog outputs are combined into a broadband signal, which is then distributed to subscribers of the television service.

1.2 Basic structure of the overall system

As shown in FIG. 5, the system 500 includes a stream server 502, a plurality M of interface cards 530, a plurality of up to M*N playback cards 504, a plurality of up to M*N modulators 536, and a channel combiner 538. A first communications means 532 permits communication between the stream server 502 and the M system interface cards 530. A second communications means 534 permits communication between each of the M system interface cards 530 and up to N associated playback cards 504. The output of each of the playback cards is coupled with the input of an associated modulator 536. The outputs of the each of the up to M*N modulators 536 are provided to inputs of the channel combiner 538.

1.3 Basic operation of the overall system

Basically, the stream server 502 provides packetized encoded data, such as MPEG-2 encoded video data for example, to the up to N*M playback cards 504 via first communications means 532, M (e.g., 10 to 15) system interface cards 530, and second communications means 534. Each of the M system interface cards 530 is coupled with up to N (e.g., up to 8) playback cards 504 via an associated backplane bus 544 which is a part of the second communications means 534. Each of the playback cards 504 outputs decoded data to an associated modulator 536. Each of the modulators 536 modulate the decoded data at a particular carrier frequency. Thus, the modulators 536 collectively provide a number (e.g., up to N*M) of narrowband signals. These narrowband signals are combined (i.e., frequency division multiplexed) by channel combiner 538 into a broadband signal. The broadband signal is provided to subscribers 542 via a distribution network 540, such as a co-axial cable distribution network for example.

Of particular relevance to the present invention are the stream server 502, the first communications means 532, the M system interface cards 530, the second communications means 534, and the up to N*M playback cards 504. The details of each of these components, as well as their operation, are explained below.

Basically, the present invention distributes buffer memories throughout the system 500 to buffer the compressed audio and video data before it is decoded at the playback cards 504. The present invention prevents these buffers memories from overflowing or running dry by facilitating back channel communication, from the playback cards 504 to an associated system interface card 530, and from the system interface cards 530 to the stream server 502. The details of the buffer memory distribution and back channel communication will be described below.

2. COMPONENTS OF THE SYSTEM

2.1 THE STREAM SERVER

2.1.1 Functions of the Stream Server

Basically, the stream server 502 of the present invention provides compressed data to be decoded at each of the up to M*N playback cards 504. More importantly, the stream server 502 provides the compressed data at such a rate to prevent the distributed buffer memories from overflowing or running dry.

2.1.2 Structure of the Stream Server

Figure 8:
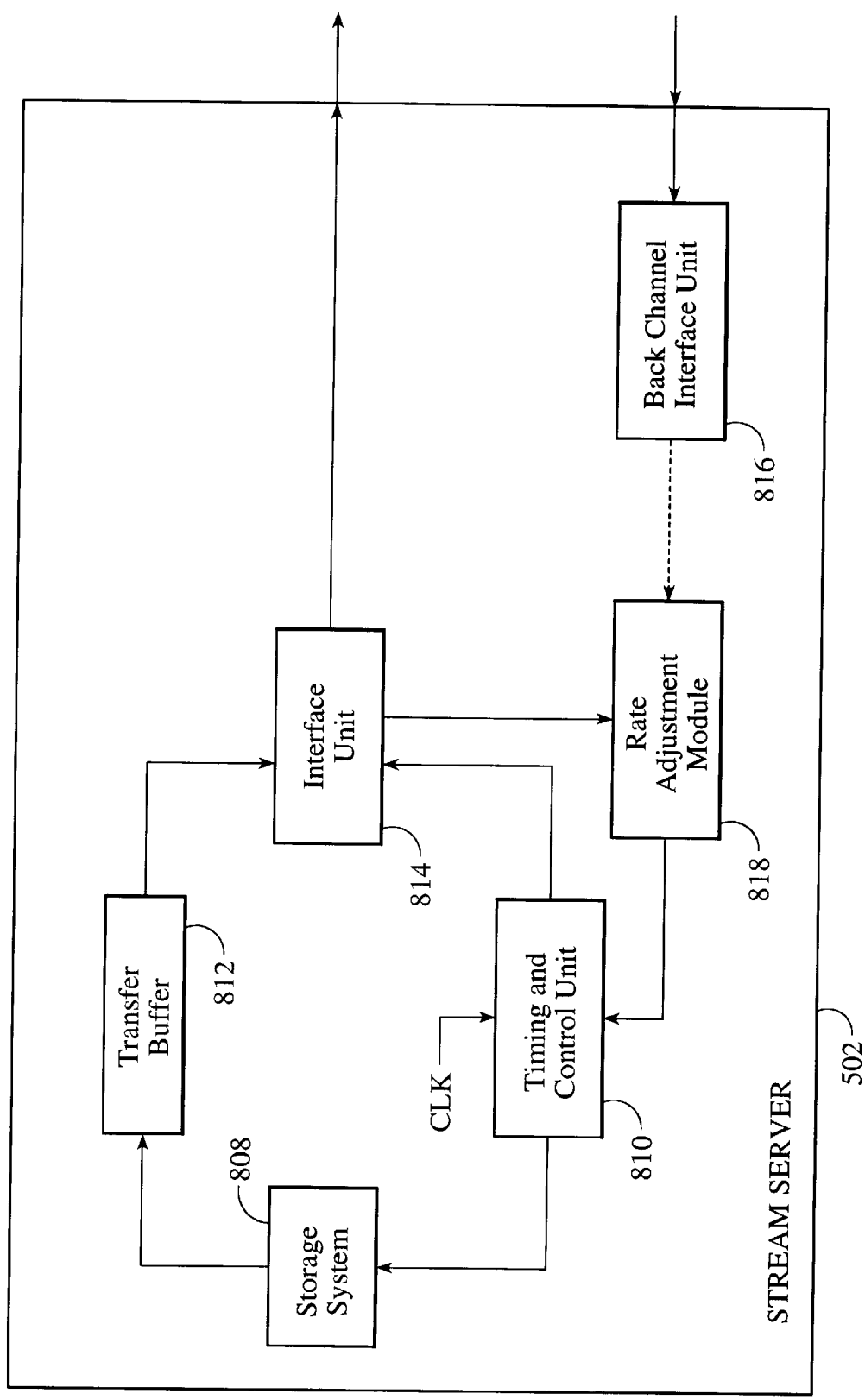
FIG. 8 is a block diagram of the stream server of the present invention.

FIG. 8 is a block diagram of the stream server 502 of the system 500. The stream server 502 includes a storage system 808, a timing and control unit 810, a transfer buffer 812, an interface unit 814, a back channel interface unit 816, and a rate adjustment module 818.

The storage system 808 stores files of packetized encoded data, such as PES or transport stream packets of MPEG-2 data for example. The encoded data has been encoded, by an MPEG-2 encoder for example, at an encode rate. The storage system 808 may include a disk or array of disks which are well-known in the art. The timing and control unit 810 controls a reading out of one or more files residing on the storage system 808 based on a clock signal CLK. The files of packetized encoded data read out from the storage system 808 are buffered in the transfer buffer 812. Under the control of the timing and control unit 810, the interface unit 814 provides data, stored in the transfer buffer 812, to the first communications means 532. The interface unit 814 multiplexes packets of encoded audio and video data to form a transport stream 112. The interface unit 814 also includes appropriate output device drivers. The control signals provided by the timing and control unit 810 to the interface unit 814 may be based on the clock signal CLK or may be based on an independent clock signal, as adjusted by the rate adjustment module 818. More specifically, based on signal (s) from the interface unit 814 (or from the back channel interface unit 816), the rate adjustment module 818 varies the control signal(s) output by timing and control unit 810 to the interface unit 814. The operation of the rate adjustment module 818 will be described in more detail below. Although the elements of the MPEG stream server 502 were described as "devices" or "units", the elements are not necessarily implemented with hardware. Rather, some of the elements of the MPEG stream server 502 may be implemented by processor executed instructions.

The MPEG stream server 502 may be a work station (executing a stored program), such as a Silicon Graphics Challenge DM or Challenge S server for example. The MPEG stream server 502 should include a processor (or processors) having (1) adequate processing speed for processing the packets, for performing the timing and control, as well as rate adjustment functions, for responding to the control signals, and for providing indicator signals (e.g., 100 MHz R4600 or 150 MHz R4400 CPUs); (2) an adequate amount of memory to store audio, video, and private application data being processed (e.g., 32 Mbytes to 2 Gbytes of RAM); and (3) a system bus having adequate throughput (e.g., 267 Mbytes to 1.2 Gbyte bandwidth). The MPEG stream server 502 should also include appropriate input/output ports and interfaces for accepting the packetized data and for transmitting the transport stream and for accepting and providing appropriate control and indicator signals (e.g., Ethernet, SCSI (or "Small Computer Standard Interface"), SCSI-2 fast and wide, FDDI (or "Fibre Distributed Data Interface"), and others).

2.2 THE SYSTEM INTERFACE CARDS

2.2.1 Function of the System Interface Cards

Each of the M interface cards 530 can be thought of as performing two functions; namely, (1) pumping transport stream data received from the stream server 502 to appropriate ones of the up to N playback cards 504, and (2) controlling the communication (e.g., scheduling, managing, and rate control) of the transport stream data. The communication of the transport stream data are controlled in two ways. First, within the interface card 530, the delivery of transport stream data to the up to N playback cards is controlled based on back channel control and status signals from the up to N playback cards associated with that playback card. Second, the rate at which the stream server 502 provides the transport stream data to a particular one of the M interface cards 530 is based on control and status signals sent by the interface card 530 to the stream server 502. Thus, the system interface card 530 is arranged to control the flow of the transport stream propagated by the stream server 502 in response to flow control information passed from the playback card(s) 504 to the system interface card 530, as well as to the status of the buffer memory 710 of the system interface card 530.

2.2.2 Structure of the System Interface Cards

Figure 7:
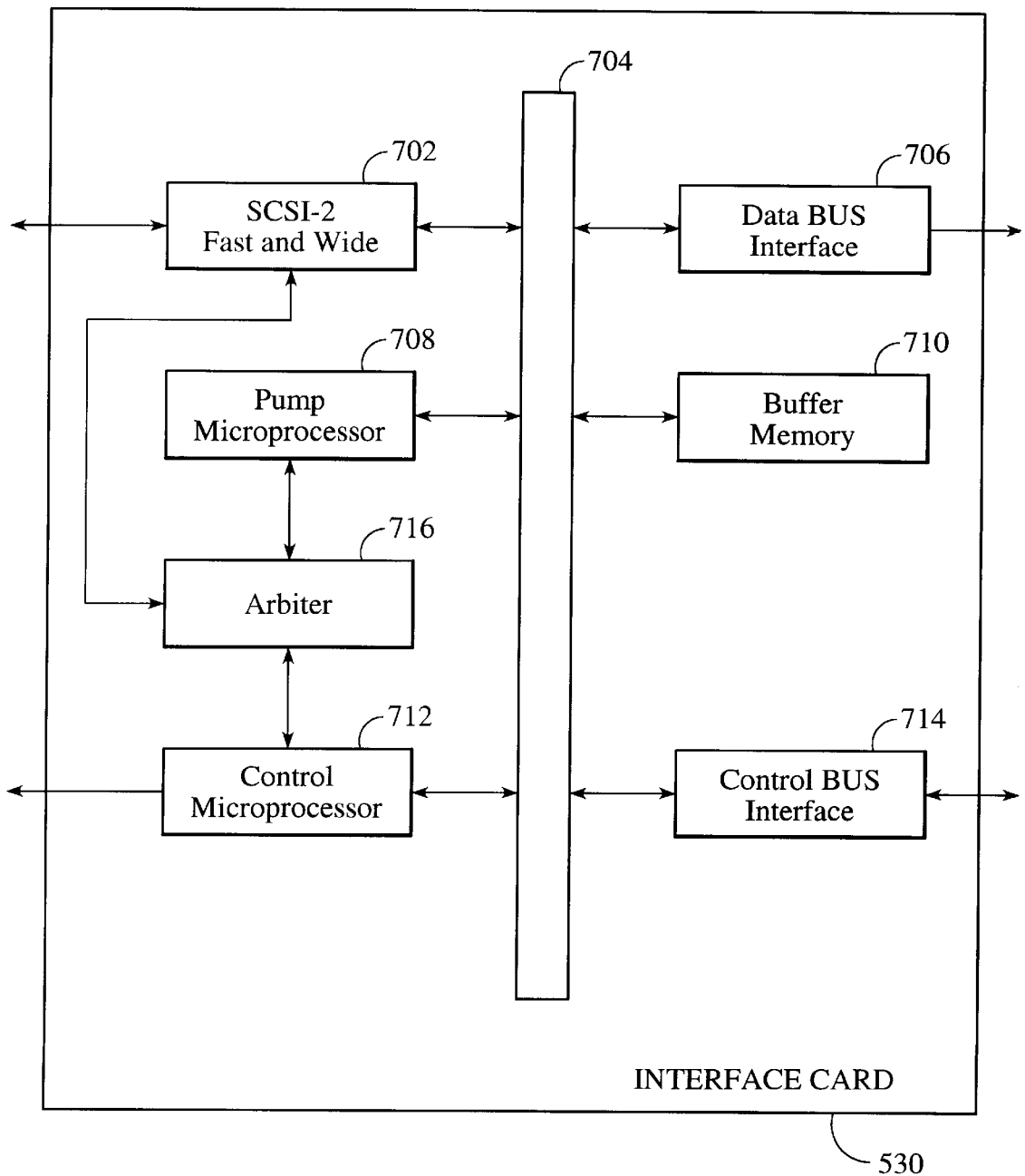
FIG. 7 is a block diagram of a system interface card of the system of FIG. 5.

FIG. 7 is a block diagram of one of the M system interface cards 530. A SCSI-2 fast and wide interface 702, a data bus interface 706, a pump microprocessor 708 and a buffer memory 710 perform the pumping function. These elements may also perform the rate control function. A control microprocessor 712 and a control bus interface 714 may perform some or all of the communications control functions. Each of these components are connected via a bus 704.

A bus arbiter 716 arbitrates control of the bus 704. Specifically, the data and address buses comprising bus 704 are subject to being mastered by three different devices, namely, the SCSI-2 fast and wide interface 702, the control microprocessor 712, and the pump microprocessor 708. The bus arbiter 716 (e.g., a field programmable gate array such as a Lattice 3256 ispLSL) couples the SCSI-2 fast and wide interface 702, the pump microprocessor 708, and the control microprocessor 712 to effect arbitration among the potential master devices. The arbiter 716 prevents one master from dominating the other possible masters. For instance, the control microprocessor 712 can only be master for a predetermined number of clock cycles (e.g., 16), and then the other possible masters may contend for the bus 704.

Regarding the components of the system interface card 530 performing the "pump" function, in a preferred embodiment of the present invention, the bus 704 is a 32 bit data bus and a 32 bit address bus. In the preferred embodiment of the present invention, the SCSI-2 fast and wide interface 702 may be a NCR720 device supplied by SIMBIOS. The SCSI-2 fast and wide interface 702 has its own DMA channel which permits it to directly move the incoming transport stream to buffer memory 710. In the preferred embodiment, the pump microprocessor 708 may be a Motorola 68349 microprocessor and the data bus interface 706 may be a field programmable gate array (such as a XC4010 available from XILINX Inc.). The pump microprocessor 708 has two DMA channels which facilitate moving data from the buffer memory 710 over the 32 bit data bus 704. The data bus interface 706 converts each 32 bit data word into four 8 bit data words for byte-wide serial transmission over the second communications means 534.

In an embodiment including up to eight (8) playback cards 504 per system interface card 530, the buffer memory 710 is preferably 18 Mbytes of DRAM (such as a MB814260 device available from Fujitsu), with the 18 Mbytes being logically divided into nine (9) two (2) Mbyte blocks (also referred to as nine (9) "buffers" or "queues") to define a two (2) Mbyte block (or buffer or queue) for each of the eight (8) playback cards 504, and two (2) Mbytes for storing processes for the control microprocessor 712. Buffer memory 710 serves as intermediate storage for the playback cards 504 in that the incoming transport stream is held in the two (2) Mbyte buffers or queues until the data are required by a corresponding one of the eight (8) playback cards 504.

Regarding the components of the system interface card 530 for performing some or all of the "control" functions, in a preferred embodiment of the present invention, the control bus interface 714 may be a field programmable gate array (e.g., a Lattice 1048c device) and the control microprocessor 712 may be a Motorola 68360 microprocessor.

Thus, to reiterate, system interface card 530 is implemented as an interdependent, two processor arrangement (namely, pump microprocessor 708 and control microprocessor 712). The resources of the control microprocessor 712 primarily perform the managing and scheduling functions for delivery of the incoming interleaved MPEG-2 transport stream to the desired ones of the playback cards 504 (i.e., the BOSS functions). The resources of pump microprocessor 708, in conjunction with SCSI-2 fast and wide interface 702, are dedicated to handling the incoming data transfers because of the high throughput rate required and preferably communicate buffer or queue status data, use for rate control, back to the stream server 502. This two processor architecture allows the appropriate data streams to be delivered to a plurality of up to N playback cards 504, thereby effectively spreading the cost of one SCSI drive over a plurality of up to N playback cards 504. This is in contrast to conventional arrangements in which there is a one-to-one correspondence, rather than a one-to-many correspondence, between the intelligence and the decoding functions, that is, normally a single processor is dedicated to each channel or playback card.

2.3 FIRST COMMUNICATIONS MEANS

2.3.1 Function of the First Communications Means

Basically, the first communications means 532 facilitates the communication of transport stream data from the stream server 502 to appropriate ones of the M system interface cards 530 and facilitates the communication of control and/or status data from the M system interface cards 530 to the stream server 502.

2.3.2 Structure of the First Communications Means

The first communications means 532 between the stream server 502 and the M system interface cards 530 may be implemented with separate forward and back channels. The forward channel may be implemented using a SCSI, e.g., a SCSI-2 fast and wide differential connection. Such a communications means 532 provides synchronous mode transfers which may be utilized to maximize MPEG data transfer rates. Those skilled in the art can readily understand that alternative communications links can be one of a variety, i.e., local or long-haul communications networks which are well known in the art. Alternative communications links or protocols known in the art include, e.g., Fibre Channel, Fibre Distributed Data Interface (or "FDDI"), and Asynchronous Transfer Mode (or "ATM"). In a preferred embodiment, a plurality of SCSI buses are provided.

As with the forward channel of the first communications means 532, the back channel transport may be any of a number which are well known in the art. For example, Ethernet, FDDI, Fibre Channel, Token-Ring, and ATM or their equivalents all provide characteristics suitable for back channel implementation. TCP/IP may be advantageously used in conjunction with any of the above and is particularly useful because it is standardized, routable, and readily accessible via standard programming interfaces, i.e., sockets.

Although the back channel has been described as being physically distinct from a forward channel, those skilled in the art can readily understand that the back channel and the forward channel could be implemented over the same physical media. In fact, in a preferred embodiment of the present invention, the forward channel and the back channel are implemented on the same, SCSI-2 interconnect(s) (bus(es)) using SCSI protocols. Although the SCSI-2 protocol is known to those skilled in the art, it will be briefly explained below for the reader's convenience. The SCSI standard and drafts of the SCSI-2 fast and wide standard authored by the American National Standard of Accredited Standards Committee X3 are hereby incorporated by reference.

The SCSI protocols allow the connection of one or more "initiators" (i.e., SCSI devices capable of initiating an operation—in this case MPEG stream servers) to one or more "targets" (i.e., SCSI devices capable of responding to a request to perform an operation—in this case the system interface cards).

During operation, the SCSI bus may pass through one or more distinct phases: i) BUS FREE phase; ii) ARBITRATION phase; iii) SELECTION phase; iv) RESELECTION phase; v) COMMAND phase; vi) DATA phase— comprising; vii) STATUS phase; and viii) MESSAGE phase. The SCSI bus can never be in more than one phase at any given time. Of particular significance to the present invention, are the SELECTION, COMMAND, DATA and STATUS phases.

The COMMAND, DATA and STATUS phases are collectively referred to as "information transfer" phases because they are all used to transfer data or control information via a SCSI data bus. The SELECTION phase allows an "initiator" (or master) to select a "target" (or slave) for the purpose of initiating some target function, e.g., a READ or WRITE command.

For example, consider a simple I/O process in which the stream server 502 is the "initiator" and uses the SCSI bus 532 to transfer a transport stream(s) to a system interface card 530 which is the "target". The I/O process begins with the stream server 502 (or initiator) arbitrating for the SCSI bus 532. Upon winning arbitration, the stream server 502 selects one of the M system interface cards 530 as a target by selecting an appropriate SCSI ID. Although the SCSI protocol supports the selection of one of up to eight (8) targets, due to bandwidth limitations of the SCSI bus data, in a preferred embodiment of the present invention, each SCSI bus has only two (2) associated targets (i.e., system interface cards 530). Once the particular system interface card 530 (or target) is selected, that system interface card 530 (or target) assumes control of the I/O process.

During the SELECTION phase, the stream server 502 (or initiator) informs the selected system interface card 530 (or target) that the stream server 502 wishes to send a message. The selected system interface card 530 (or target) enters a MESSAGE OUT phase and transfers an IDENTIFY message from the stream server 502 (or initiator). The IDENTIFY message informs the selected system interface card 530 (or target) which one of a plurality of logical units is to be used for the I/O process. The logical unit is identified by a logical block address in the SCSI transfer packet. For example, each of the eight (8) of the two (2) Mbyte blocks (or "queues") of the buffer memory 710 of a system interface card 530 may be considered to be a separate "logical unit".

The selected system interface card 530 (or target) then switches to the COMMAND phase and transfers a command descriptor block from the stream server 502 (or initiator). In this example, the command descriptor block contains a WRITE command. The selected system interface card 530 (or target) (i) interprets the command, (ii) switches to a DATA OUT phase, (iii) transfers the transport stream(s) (or data) from the stream server 502 (or initiator) to the selected system interface card 530 (or target), (iv) switches to STATUS phase and, (v) assuming successful transfer, sends a GOOD status to the stream server 502 (or initiator).

2.4 THE PLAYBACK CARDS (OR CHANNEL INTERFACE CARDS)

2.4.1 Function of the playback cards

Basically, each of the playback cards 504 converts compressed audio and video data encapsulated in the transport stream into decoded audio and video signals. These signals may be analog signals for example, with the decoded audio signal being encoded into the BTSC standard and the decoded video signal being encoded into the NTSC (or National Television Standards Committee) standard for example. The playback cards 504 also communicate status and control information to an associated system interface card 530.

2.4.2 Structure of the playback cards

Figure 6:
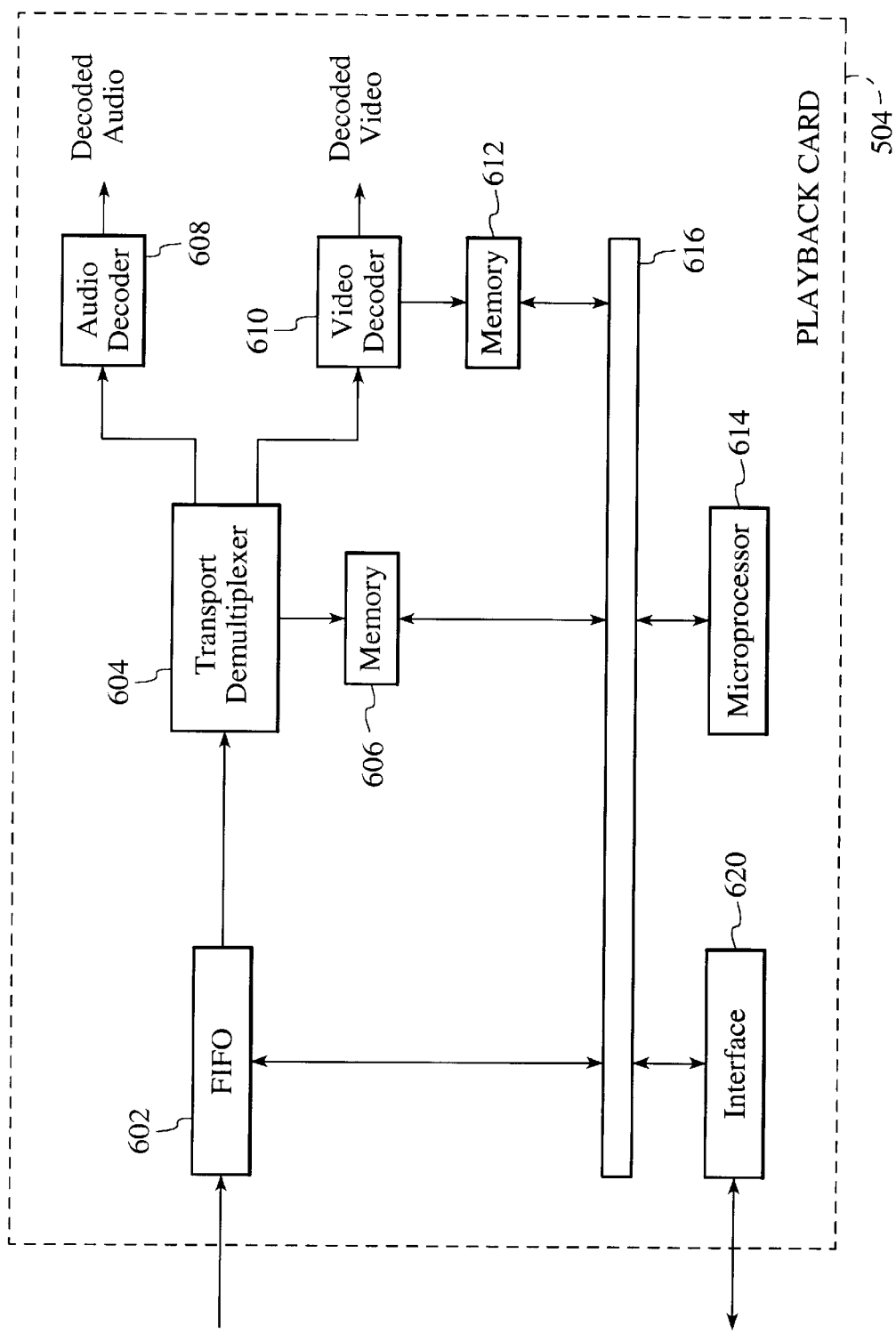
FIG. 6 is a block diagram of a playback card of the system of FIG. 5.

As shown in FIG. 6, each of the playback cards 504 includes, inter alia, a first-in first-out memory device 602, a transport demultiplexer 604, an audio decoder 608, a video decoder 610, a microprocessor 614, a microprocessor bus 616, and a backchannel interface device 620. The transport demultiplexer 604 and the video decoder 610 may be provided with their own memory 606 and 612, respectively.

In the playback card 504, the transport demultiplexer 604 and the video decoder 610 use a hardware handshake to determine when the memory 612 of the video decoder 610 is full. The microprocessor 614 monitors the memory 606 associated with the transport demultiplexer 604 to determine when its storage is full, which implicitly means that the memory 612 of video decoder 610 is also full.

2.5 SECOND COMMUNICATIONS MEANS

2.5.1 Function of the Second Communications Means

Basically, the second communications means 534 facilitates the communication of transport stream data from the the system interface card 530 to associated ones of the up to N playback cards 504 and facilitates the communication of control and/or status data from the up to N playback cards 504 to the associated system interface card 530.

2.5.2 Structure of the Second Communications Means

Figure 11:
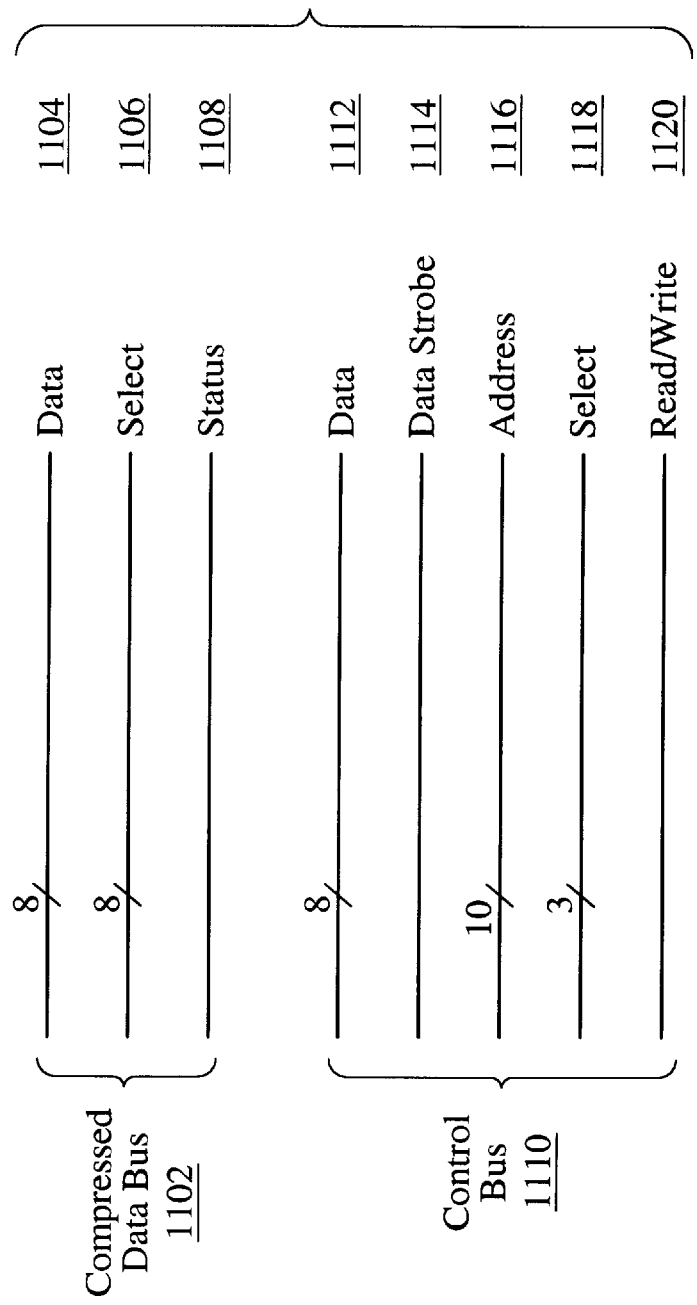
FIG. 11 illustrates a compressed data bus and a control bus which may be used in the system of FIG. 5.

FIG. 11 illustrates a preferred embodiment of the second communications means 534. As shown in FIG. 11, the second communications means 534 includes a compressed data bus 1102 and a control bus 1110. In general, the compressed data bus 1102 is used to facilitate the high speed transfer of data from the system interface card 530 to a playback card 504. On the other hand, the control bus is used for low speed back channel communication.

The compressed data bus 1102 includes (i) an eight bit wide data bus 1104, (ii) an eight bit wide select bus 1106, and (iii) a STATUS line 1108.

The select bus 1106 carries a signal selecting one of eight playback cards 504 to receive the transport stream emitted by the data bus. Thus, the width of the select bus 1106 depends on the number N of playback cards 504 which may be associated with a given system interface card 530.

The status line 1108 carries a signal which communicates two bits of information, per playback card 504 (namely, flow control and interrupt information) between system interface card 530 and the playback cards 504. The status data on the status line 1108 is carried by sixteen time-multiplexed slots—two time-multiplexed slots for each of the eight (8) playback cards 504. If up to N playback cards 504 are associated with each system interface card 530, the status data on the status line 1108 is carried by 2*N time-multiplexed slots. One time slot carries the flow control bit, and the other time slot carries the interrupt bit.

Whenever a particular playback card 504 requires data, the flow control bit is asserted to reflect the state of the buffers 606 and 612 of the playback card 504. For example, a "1" bit may be used to indicate that the memory 606 associated with the transport demultiplexer 604 is full. Since the memory 606 only begins to fill when the memory 612 of the video decoder 610 is already full, the fact that the memory 612 is full is implied. The interrupt bit is asserted by the playback card 504 when it needs servicing. For example, in one embodiment of the system 500 in which the present invention may operate, each playback card receives a network program signal source which includes cue tones for indicating commercial breaks. The playback card 504 decodes the cue tone signals and asserts an interrupt signal on the appropriate time slot of the status line. The decoded cue tone information can then be sent from the playback 504 to the stream server 502 via the data bus 1112 of the control bus 1110, the system interface card 530 (via, e.g., control bus interface 714, bus 704, and control microprocessor 712), and the first communications means 532, to request a particular commercial advertisement.

In a preferred embodiment of the present invention, the control bus 1110 includes (i) an eight bit wide control data bus 1112, (ii) a data strobe line 1114, (iii) a ten bit wide control address bus 1116, (iv) a three bit wide select bus 1118, and (v) a read/write (R/W) line 1120. The select bus 1118 permits the eight playback cards 504 to be accessed, typically on a polling basis or in response to an interrupt request. The R/W line 1120 allows data to be written to each playback card 504. In addition, the playback card 504 can pass information back to the control bus interface 714 as directed by the R/W line 1120.

3. DETAILED OPERATION OF THE SYSTEM

3.1 Communications of Compressed Data from the Stream Server to a Playback Card

3.1.1 Stream Server to System Interface Card

In one illustrative embodiment, which is the focus of the following discussion, the SCSI-2 fast and wide interface protocol is implemented over the first communications means 532, the stream server 502 is the master, and the system interface card 530 is the slave (or initiator and target, respectively, in SCSI-2 terminology). Thus, the stream server 502 communicates with system interface card 530 as if it is a SCSI disk. Accordingly, the system interface card 530 is given an identification number (SCSI ID) as is conventional for the SCSI protocol. (In another illustrative embodiment, the roles of initiator and target are reversed; the embodiment that is deployed in any given situation depends upon the particular technical requirements of the application). As mentioned above, the SCSI protocol supports the selection of up to eight (8) target devices. However, due to bandwidth limitations of the SCSI bus, in a preferred embodiment of the present invention, a plurality of SCSI buses are provided, each SCSI bus having only two (2) associated system interface cards 530.

The MPEG-2 compliant transport stream transmitted from stream server 502 to system interface card 530 is processed by the SCSI-2 fast and wide interface 702 (e.g., a NCR720 device supplied by SIMBIOS ) which implements the system interface card 530 side of the SCSI-2 fast and wide protocol. The incoming transport stream is passed by the SCSI-2 fast and wide interface 702 to buffer memory 710 over bus 704. The SCSI-2 fast and wide interface 702 has its own DMA channel which permits it to directly move the incoming transport stream to buffer memory 710. The data are transferred to a particular one of the eight (8) two (2) Mbyte queues of the buffer memory 710 based on the logical block address in the SCSI transfer packet.

As discussed above, in a preferred embodiment of the present invention, the bus 704 includes a 32 bit data bus and a 32 bit address bus. In an embodiment including up to eight (8) playback cards 504 per system interface card 530, the buffer memory 710 is preferably 18 Mbytes of DRAM (such as a MB814260 device available from Fujitsu), with the 18 Mbytes being logically divided into nine (9) two (2) Mbyte blocks (also referred to as nine (9) "buffers" or "queues"); a two (2) Mbyte block for each of the eight (8) playback cards 504, and two Mbytes for storing processes for control microprocessor 712 (e.g., a Motorola 68360 microprocessor). Buffer memory 710 serves as intermediate storage for the playback cards 504 in that the incoming transport stream is held in two (2) Mbyte queues until the data are required by a corresponding one of the eight (8) playback cards 504. Accordingly, buffer memory 710 serves to receive and divide the interleaved transport stream of incoming MPEG-2 data for delivery to the playback cards 504.

Thus, the system interface card 530 functions to "de-concentrate" the incoming transport stream or, from another viewpoint, the system interface card 530 is an expander so that a plurality of up to N playback cards 504 can be handled with only one SCSI-2 fast and wide interface. Consequently, replicated hardware, as would be required if each playback card 504 had a separate incoming transport stream handled by a SCSI interface device dedicated to that separate stream, is not required due to the system interface card 530.

3.1.2 System Interface Card to Playback Card

The transport stream from the stream server 502 is received by the SCSI-2 fast and wide interface 702 of a targeted one of the interface cards 530. To reiterate, the incoming transport stream is provided to the buffer memory 710 via bus 704. The transport stream stored in the buffer memory 710 is then provided to an appropriate one of the up to N playback cards 504 associated with the particular interface card 530 via the bus 704 and the data bus interface 706 under control of the pump microprocessor 708.

More specifically, the incoming packets are routed under control of system interface card 530 into a plurality of queues (i.e., different areas of the buffer memory 710) and stored in such different areas of buffer memory 710 in correspondence to the number N of playback cards 504. A program file stored in a queue of the buffer memory 710 is composed of MPEG-2 standard transport streams encapsulating related elementary streams such as audio, video, and control. In broad terms, system interface card 530 receives the program files as a number of SCSI-2 logical devices, again in correspondence to the number of playback cards 504, even though there may be only one physical interface. Again, the data are transferred to a particular one of the eight (8) two (2) Mbyte queues based on the logical block address in the SCSI transfer packet.

In addition, whenever data are passed from a system interface card 530 to each playback card 504, the data bus interface 706 converts each 32 bit data word into four eight bit data words for byte-wide serial transmission over the data lines 1104 of the compressed data bus 1102 of the second communications means 534. The particular playback card 504 to receive the serial data are determined by the location of the serial data in the buffer memory 710, that is, by which one of the eight (8) two (2) Mbyte queues the data are stored.

Data stored in the buffer memory 710 is retrieved under control of pump microprocessor 708 (e.g., a Motorola 68349 microprocessor) and passed to the data bus interface 706, which is illustratively a field programmable gate array (such as a XC4010 available from XILINX Inc.). The pump microprocessor 708 has two DMA channels which facilitate moving the data from the buffer memory 710 over the 32 bit data bus 704. The data bus interface 706 places the digital data onto the eight bit data bus 1104 of the compressed data bus 1102 of the second communications means 534.

Recall from FIG. 5 that the stream server 502 provides data to up to M*N playback cards 504 via the first communications means 532, the M system interface cards 530, and the second communications means 534. Thus, the multi-plexed packets of encoded audio and video data may tend to arrive at a particular playback card 504 in bursts. The FIFO memory device 602 buffers such bursty data and provides the buffered transport stream to the transport stream demultiplexer 604. The transport stream demultiplexer 604, inter alia, separates the packets of encoded audio data from the packets of encoded video data based on the PID number 220 of the header 114 of the transport stream packets 200. Private data packets, which are similarly identified with a unique PID(s) 220, may be provided to memory 606. From there, the private data may be provided to other portions of the playback card 504 via the microprocessor bus 616 under the control of the microprocessor 614.

The encoded audio data are provided to the audio decoder 608 and the encoded video data are provided to the video decoder 610. The memory 612 of the video decoder 610 may be used as a frame buffer. The audio decoder 608 outputs decoded audio data and the video decoder 610 outputs decoded video data. The decoded audio and video data may be further processed in the playback card 504. However, the details of such further processing are not necessary for understanding the present invention.

Data concerning the status of the playback card may be determined by the microprocessor 614 and provided to a back channel via the microprocessor bus 616 and the back channel interface card 620.

3.2 Backchannel Communication

From the description to this point, it is clear that the video data, besides being initially stored in the stream server 502, is also stored in three intermediate memories: namely, (i) the buffer memory 710 of system interface card 530, (ii) the memory 606 of the transport demultiplexer 604 of the playback card 504, and (iii) the memory 612 of the video decoder 610 of the playback card 504. In a preferred embodiment of the present invention: (1) the memory 612 of the video decoder 610 is fully loaded first; (2) next, the memory 606 of the transport demultiplexer 604 is fully loaded; and (3) finally, the buffer memory 710 of the system interface card 530 is loaded to a predetermined level. Thus, in the present invention, the data needed to generate the analog video is distributed within the overall system 500 to optimize analog video generation in a timely manner.

As outlined earlier, a normal MPEG-2 transport stream is emitted from the stream server 502 with the presumption that downstream circuitry is arranged to handle the transport stream without loss of incoming data bits. As just pointed out in the discussion of the cascade of three intermediate memories, it is possible to fill all intermediate memories before any of the data are required to generate the analog video signal. This may be referred to as "pre-charging" the buffers. The present invention provides a back flow control mechanism to control (or adjust) the rate at which the MPEG-2 transport stream is provided to ensure no data bits from the transport stream are lost.

Data, such as decoded cue tone information for example, of the up to N playback cards 504 associated with the interface card 530 may be provided to the stream server 502 through (i) the control bus 1110 of the second communications means 534, (ii) the control bus interface 714 of the system interface card 530, (iii) the bus 704 of the system interface card 530, and (iv) the control microprocessor 712 of the system interface card 530.

With respect to the back channel communication of control and status information between the system interface card 530 and the stream server 502, an Ethernet link may be used. Thus, the first communications means 532 may include this separate Ethernet link. The protocol used over the Ethernet link is the standard TCP/IP protocol. Alternatively, and preferably, the system interface card 530 communicates control information over the same SCSI-2 fast and wide connections used to communicate data from the stream server 502 to the system interface card 530.

Data regarding the state(s) of the queue(s) of the buffer memory 710 of a system interface card 530 may be provided to the stream server 502 via the pump microprocessor 708, bus 704, and SCSI-2 fast and wide interface 702. Alternatively, such data may be provided to the stream server 502 via control microprocessor 712 over a separate back channel (e.g., Ethernet) link. In either case, the stream server 502 uses such data to adjust the rate at which it provides the transport stream.

3.2.1 Playback Card to System Interface Card

One embodiment of the present invention may be characterized as follows. In the playback card 504, the transport demultiplexer 604 and the video decoder 610 use a hardware handshake to determine when the memory 612 of the video decoder 610 is full. The microprocessor 614 monitors the memory 606 associated with the transport demultiplexer 604 to determine when its storage is full, which implicitly means that the memory 612 of video decoder 610 is also full.

When transport demultiplexer 604 can no longer accept data for storage, the microprocessor 614 of the playback card 504 conveys this information to the pump microprocessor 708 of the system interface card 530 via the status line 1108 of the compressed data bus 1102 of the second communications means 534, the data bus interface 706, and the bus 704. In response, the pump microprocessor 708 inhibits transfer of data to the playback card 504 via the data bus interface 706. Consequently, the queue of the buffer memory 710 associated with the particular playback card 504 begins to fill.

As mentioned, the status line 1108 of the compressed data bus 1102 of the second communications means 534 carries back flow information from a playback card 504 to the system interface card 530. As discussed above in the description of the second communications means 534, in one embodiment of the present invention, the status line 1108 is divided into 16 time-multiplexed slots —two (2) for each of eight (8) playback cards 504. One (1) of the two (2) slots is used for the back-flow control; for instance, a "0" bit would indicate that transport demultiplexer 604 can accept a transport data stream, whereas a "1" bit would indicate that the memory 606 associated with the transport demultiplexer 604 is full.

The other one of the two time slots may be used to signal the control microprocessor 712 of the system interface card 530 that the playback card 504 needs servicing. That is, this other time slot carries an interrupt request. The communication which occurs over the status line 1108 is asynchronous with respect to any data being transmitted over the data lines 1104 of the compressed data bus 1102 of the second communications means 534. That is, either or both the flow control and interrupt request can occur independently in time relative to the transmitted data.

The control connection on the playback card side of system interface card 530 is provided by control bus interface 714, which is illustratively a field programmable gate array (e.g., a Lattice 1048c device). The control bus interface 714 is coupled to the control bus 1110 of the second communications means 534. The control bus 1110 supports the logical control connection of second communications means 534. As discussed above in the description of the second communications means 534, in a preferred embodiment of the present invention, the control bus 1110 includes (i) an eight (8) bit wide control data bus 1112, (ii) a data strobe line 1114, (iii) a ten (10) bit wide control address bus 1116, (iv) a three (3) bit wide select bus 1118, and (v) a read/write (R/W) line 1120. The three (3) bit select bus 1118 allows the eight (8) playback cards 504 to be accessed, typically on a polling basis or in response to an interrupt request. The R/W lead 1120 allows data to be written to each playback card 504 (e.g. via microprocessor 614 and interface 620 of the playback card 504). In addition, the playback card 504 can pass information back to the control bus interface 714 as directed by the R/W lead 1120.

The control bus interface 714 translates 32 bit data words of the bus 704 to eight bit data words required by the playback cards 504, and vice versa.

3.2.2 System Interface Card to Stream Server

As described in more detail below, the system interface card 530 preferably communicates information regarding the status of the queue(s) of the buffer memory 710 to the stream server 502, using the SCSI-2 protocol. If the stream server 502 determines that the queue(s) of the buffer memory 710 has reached the predetermined level, the stream server 502 truncates the transmission of transport streams to system interface card 530 for the given playback card 504. Then, the stream server 502 polls the other of the playback cards 504 for servicing. In a preferred embodiment of the present invention, the stream server 502 concurrently executes separate processes for each playback card 504. Consequently, the sampling of the queues of the buffer memory 710 of the system interface card 530 by the stream server 502 is asynchronous since such sampling is based on the MPEG encoding/decoding delivery rate of a channel. Upon returning to the playback card 504 (which previously blocked a transport stream in this example), the stream server 502 will again attempt to transmit the same transport stream that was rejected earlier. This transport stream may be accepted if the level of the queue (or section) of the buffer memory 710 corresponding to that particular playback card 504 has dropped. Otherwise, the transport stream from the stream server 502 may again be rejected. The stream server 502 continues its "round-robin" polling of the playback cards 504.

With respect to the control connection function of the first communications means 532, the incoming Ethernet link terminates in the control microprocessor 712. This link, may be used, for example to transfer control signals (such as received cue tone information) from the playback card 504 to the stream server 502 so that the stream server 502 may respond appropriately (e.g., so that it can select and schedule an advertisement for output by the playback card 504 in response to the cue tone signal in a secondary video source received by the playback card 504). In an alternative embodiment of the present invention, this link may be used to communication queue state data to the stream server 502.

However, as discussed above, the control connection between the system interface card 530 and the stream server 502 is preferably performed over the same SCSI-2 fast and wide connection used to communicate data from the stream server 502 to the system interface card 530. Specifically, the control microprocessor 712 can arbitrate, via arbitration logic 716, into the address space of the SCSI-2 fast and wide interface 702, thereby leaving messages/data in the buffer memory 710 for the SCSI-2 fast and wide interface 702 or by retrieving messages/data from the SCSI-2 fast and wide interface 702 (via the two Mbyte block reserved for processes of the control microprocessor 712). Thus, the control microprocessor 712 may indirectly access each device which the SCSI-2 fast and wide interface 702 may access.

It is further supposed, that eventually, the memory area allocated to the playback card 504 (e.g., two MByte queue) in buffer memory 710 becomes filled to, at least, a predetermined level (say one half full) since the playback card 504 can no longer store data originating from the buffer memory 710. The pump microprocessor 708 receives an indication over bus 704 that the queue of the buffer memory 710 associated with the particular playback card 504 has reached the predetermined level, and relays this indication to the SCSI-2 fast and wide interface 702 via bus 704. Alternatively, the control microprocessor 712 may transfer address pointers associated with each of the eight (8) queues of the buffer memory 710 to the stream server 502.

Alternatively, as discussed above, the stream server 502 may be arranged to handle each of the queues in buffer memory 710, corresponding to each of the up to N playback cards 504 associated with the system interface card 530, as a logical disk so that standard SCSI-2 commands can be used to write each separate queue in buffer memory 530. The SCSI-2 driver software is executed by the pump microprocessor 708 and controls the SCSI-2 fast and wide interface 702; this driver is arranged to manage a "write" from stream server 502 in the following manner. On every write from the stream server 502, this driver returns a "status" signal indicating the "fill level" for the current queue in the buffer memory 710 that is being written to by stream server 502. The driver inhibits a write to a queue of the buffer memory 710 that is full to a predetermined level. For example, in such instances, the system interface card 530 will ignore the incoming data and send back a WRITE_FAIL message to the stream server 502. Upon receipt of such a WRITE_FAIL message, the stream server 502 does not advance its read pointer. Thus, the stream server 502 resends this data.

Based on the status indication transmitted by a system interface card 530, the stream server 502 can adjust the rate of data transfer to the given queue of the buffer memory 710. Whenever the queue of the buffer memory 710 is free to again be rewritten, a status signal informs the stream server 502 of this condition, so a resend of the previously denied data block may be retransmitted. As outlined earlier, the stream server 502 then "round robins" to determine which remaining playback cards 504 may accept transport streams; that is, those playback cards 504 which have not asserted back flow control.

Figure 9B:
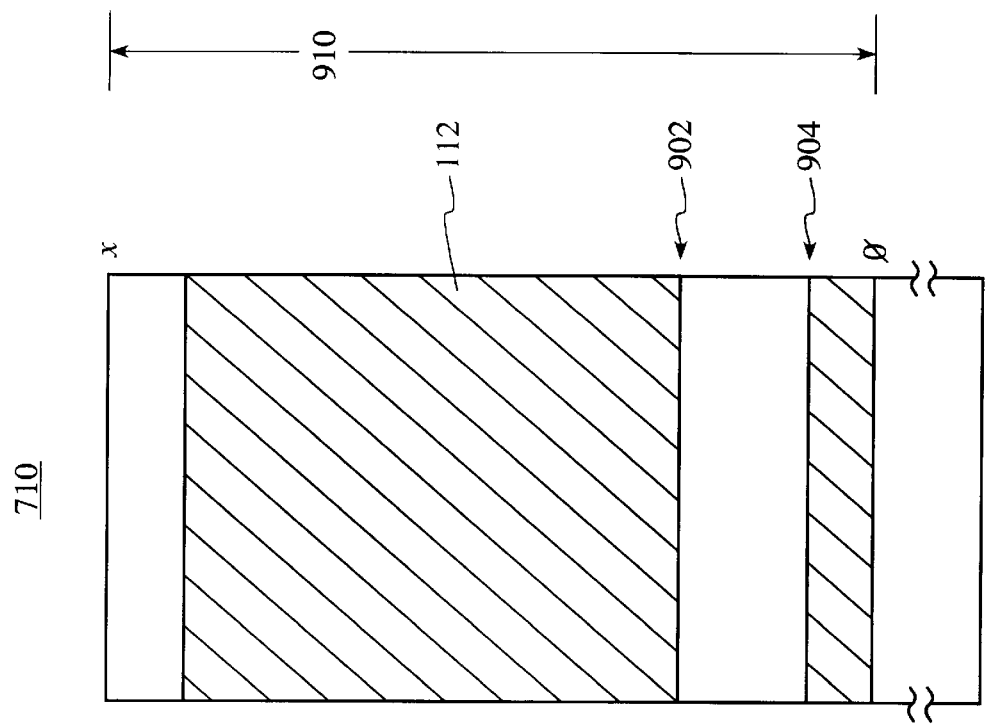
FIGS. 9a and 9b illustrate states of a buffer (or queue) monitored by the method of the present invention.
Figure 9A:
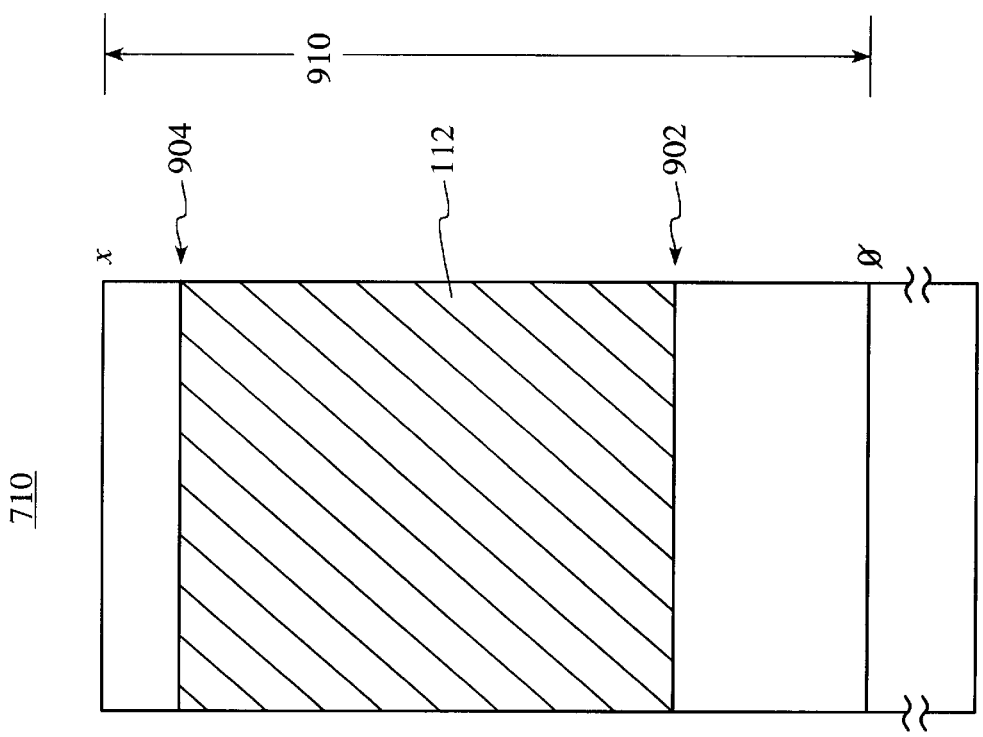

The method and device of the present invention are particularly concerned with the states of the eight queues of the buffer memory 710. That is, each queue of the buffer memory 710 should neither overflow nor run dry, even if drift is present in the system 500. As shown in FIGS. 9a and 9b, each queue of the buffer memory 710 of the interface card 530 can be thought of as a FIFO (or queue) having x (e.g., two Mbytes of) storage locations. Alternatively, each queue of the buffer memory 710 may be thought of as a circular buffer.

A first pointer 902 indicates a storage location of the start of the stored transport stream 112 and a second pointer 904 indicates a storage location of the end of the stored transport stream 112 in a particular queue.

If, as shown in FIG. 9a, the storage location associated with the second pointer 904 is greater than the storage location associated with the first pointer 902, the number of locations of a queue of the buffer memory 710 occupied by the transport stream 112 can be determined by subtracting the first pointer 902 from the second pointer 904. If, however, as shown in FIG. 9b, the storage location associated with the second pointer 904' is less than the storage location associated with the first pointer 902', the number of locations of the queue of the buffer memory 710 occupied by the transport stream can be determined by subtracting the first pointer 902' from the total number of memory locations x and adding the second pointer 904'. In either case, the percentage of the buffer memory 710 utilized can be determined by dividing the amount of memory occupied by the transport stream 112 by the total amount of memory x, and then multiplying the result by 100.

As discussed above, the pump microprocessor 708 (or alternatively, the control microprocessor 712) monitors the pointers 902 and 904 of the buffer memory 710 and provides related information to the stream server 502 via the SCSI-2 fast and wide interface 702 (or separate Ethernet back channel). In the present invention, the GOOD status sent during the STATUS phase contains the first and second pointers 902 and 904 which serve to identify a next location for reading/writing the queue of the buffer memory 710, as well as providing an indication of the amount of the queue of the buffer memory 710 used. The first and second pointer values 902 and 904, respectively, may also be provided to the stream server 502 via the SCSI-2 fast and wide link in an ACKNOWLEDGMENT message.

This information is received by the rate adjustment module 818 of the stream server 502, via the interface unit 814 or, if a separate back channel Ethernet link is used, via the back channel interface unit 816. The rate adjustment module 818 adjusts the rate at which the stream server 502 provides the transport stream by modifying the timing control signals provided to the interface unit 814 by the timing and control unit 810.

Figure 10:
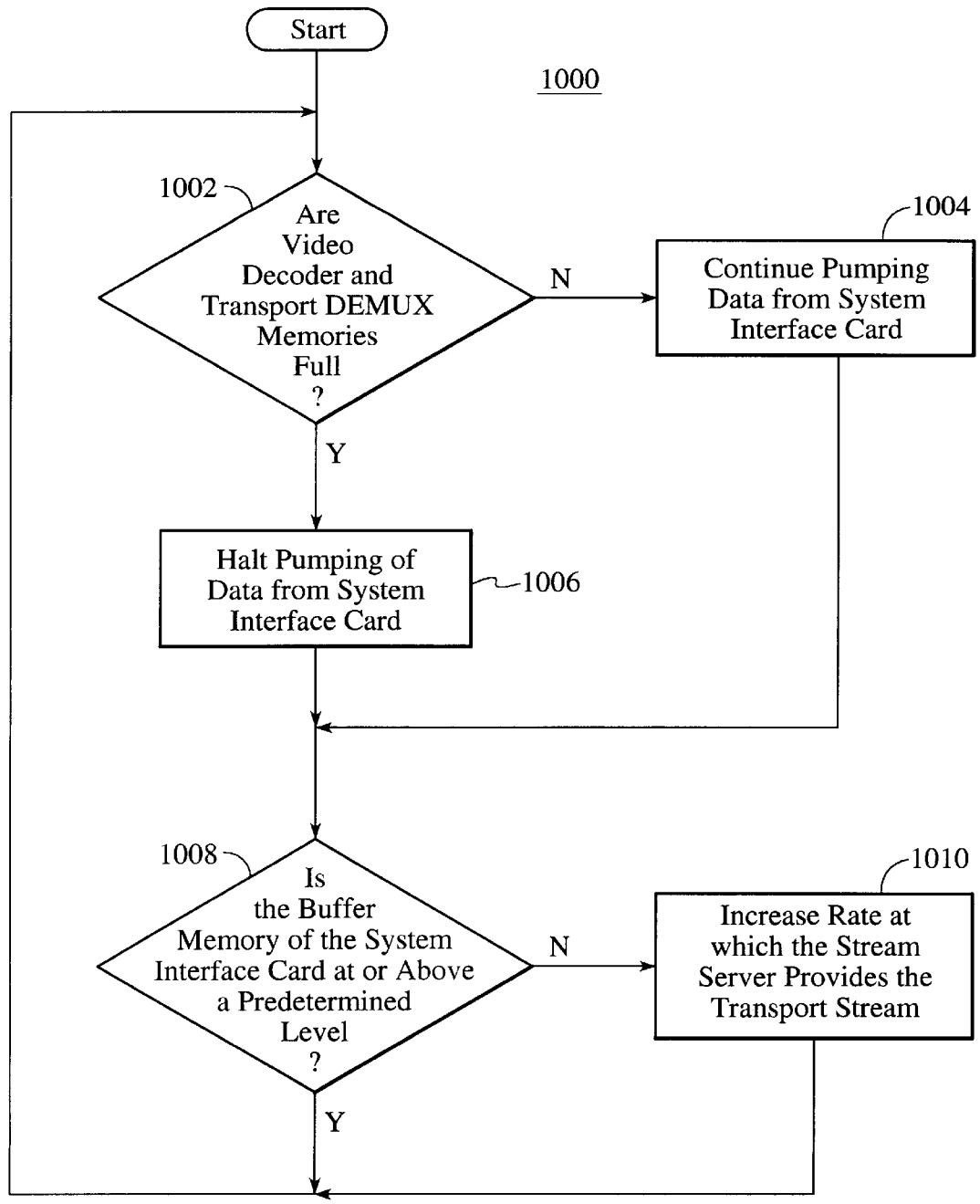
FIG. 10 is a flow diagram of the general operation of the method of the present invention.

Thus, as illustrated in the flow diagram of FIG. 10, the general operation of the device of the present invention is as follows. First, as shown in steps 1002 and 1004, if the video decoder and transport demultiplexer memories 612 and 606, respectively, are not full, the system interface card 530 continues pumping data to the particular playback card 504. Otherwise, as shown in step 1006, the provision of such data by the system interface card 530 is halted.

Next, as shown in steps 1008 and 1010, if a queue of the buffer memory 710 of the system interface card 530 is not at or above a predetermined level, the rate at which the stream server 530 provides the transport stream to that particular queue is increased. This process is described in greater detail below.

4. DETAILED OPERATION OF THE RATE ADJUSTMENT OF THE STREAM SERVER

Figure 12:
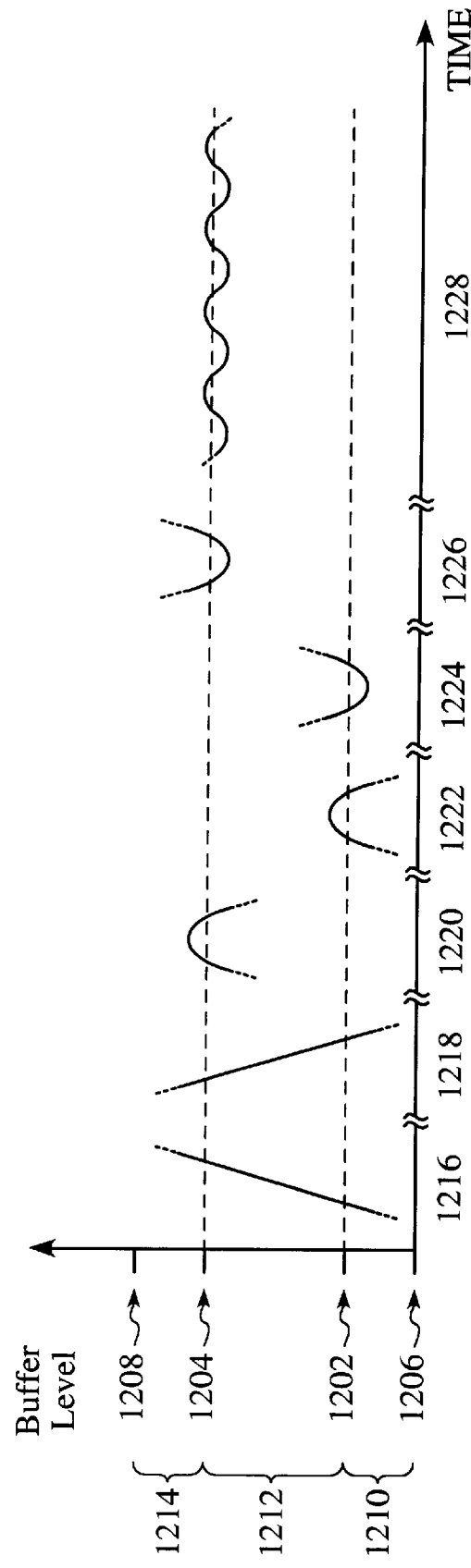
FIG. 12 is a graph which illustrates buffer (or queue) states and buffer (or queue) level trajectories monitored by the method of the present invention.

FIG. 12 is a graph which illustrates the buffer (or "queue") states and buffer (or "queue") level trajectories monitored by the method and device of the present invention. The buffer has a low state 1210, a medium state 1212, and a high state 1214. The boundary 1202 between the low state 1210 and the medium state 1212 shall be referred to as "the low-water mark 1202". The boundary 1204 between the medium state 1212 and the high state 1214 shall be referred to as "the high water mark 1204". Buffer level 1206 shall be referred to as "empty" and buffer level 1208 shall be referred to as "full". In the above described embodiment, in which each playback card 504 is assigned a two MByte portion of the buffer memory 710, the low state 1210 may include buffer levels between zero (0.0) and 0.5 MBytes, the medium state 1212 may include buffer levels between 0.5 MBytes and 1.5 MBytes, and the high state 1214 may include buffer levels between 1.5 MBytes and two (2.0) MBytes.

As discussed above with reference to FIGS. 9a and 9b, a current buffer level, and thus, a corresponding buffer state, may be determined from address pointers 902 and 904. Various types of changes in the buffer level with respect to time are shown in FIG. 12. Although in each temporal section 1216, 1218, 1220, 1222, 1224, 1226, and 1228 the plots of the buffer level with respect to time are shown as continuous plots, the buffer level, as determined by pointers 902 and 904 is actually determined at discrete time intervals. In the following, the stream server 502, or alternatively, the interface card 530, can determine a trend in the buffer level by comparing a present buffer state with one or more past buffer states.

In the following, although the temporal sections 1216, 1218, 1220, 1222, 1224, and 1226 are shown in a particular order, such temporal sections may occur in any order.

Temporal sections 1216 and 1218 illustrate buffer level trajectories that never change direction. Such buffer level trajectories shall be referred to as "monotonic" buffer level trajectories. Such monotonic buffer level trajectories typically occur at the beginning and the end of the transmission of stream sequence by the stream server 502. The above described occurrence of drift will also manifest itself as monotonic buffer level trajectories.

On the other hand, temporal sections 1220, 1222, 1224, and 1226 illustrate buffer level trajectories that cross a state boundary (i.e., the low-water mark 1202 or the high-water mark 1204) trending in one direction, and then, cross the same state boundary trending in another direction. Such buffer level trajectories shall be referred to as "ballistic" buffer level trajectories. For example, as shown in temporal section 1220, the ballistic buffer level trajectory crosses the high-water mark 1204 trending higher and then, recrosses the high-water mark trending lower. In temporal section 1222, the ballistic buffer level trajectory crosses the low-water mark 1202 trending higher and then, recrosses the low-water mark 1204 trending lower. In temporal section 1224, the ballistic buffer level trajectory crosses the low-water mark 1202 trending lower and then, recrosses the low-water mark 1202 trending higher. Finally, in temporal section 1226, the ballistic buffer level trajectory crosses the high-water mark 1204 trending lower and then, recrosses the high-water mark 1204 trending higher.

In general, the rate at which the stream server 502 supplies a transport stream is adjusted only based on the state of the buffer level of the buffer corresponding to the playback card 504 to which the transport stream is destined. However, the type of trajectory may also be used to adjust the rate. For example, the ballistic trajectory shown in temporal segment 1222 may be considered to indicate an impending buffer starvation condition (i.e., the buffer is about to run dry). In such a case, the rate would be increased accordingly. In addition, start-up or error recovery conditions may be used in determining the rate. For example, upon start up, the buffer level may be empty 1206. In such a case, an extremely high rate is required.

Temporal section 1228 illustrates a buffer level trajectory during normal steady state operation. Specifically, the buffer level should stay close to the high-water mark 1204. As discussed in more detail below with reference to FIGS. 13 and 14, such operation is accomplished by slightly decreasing the rate when a middle state 1212 to high state 1214 transition is determined (or when in the high state 1214) and slightly increasing the rate when a high state 1214 to middle state 1212 transition is determined (or when in the medium state 1212).

Figure 13A:
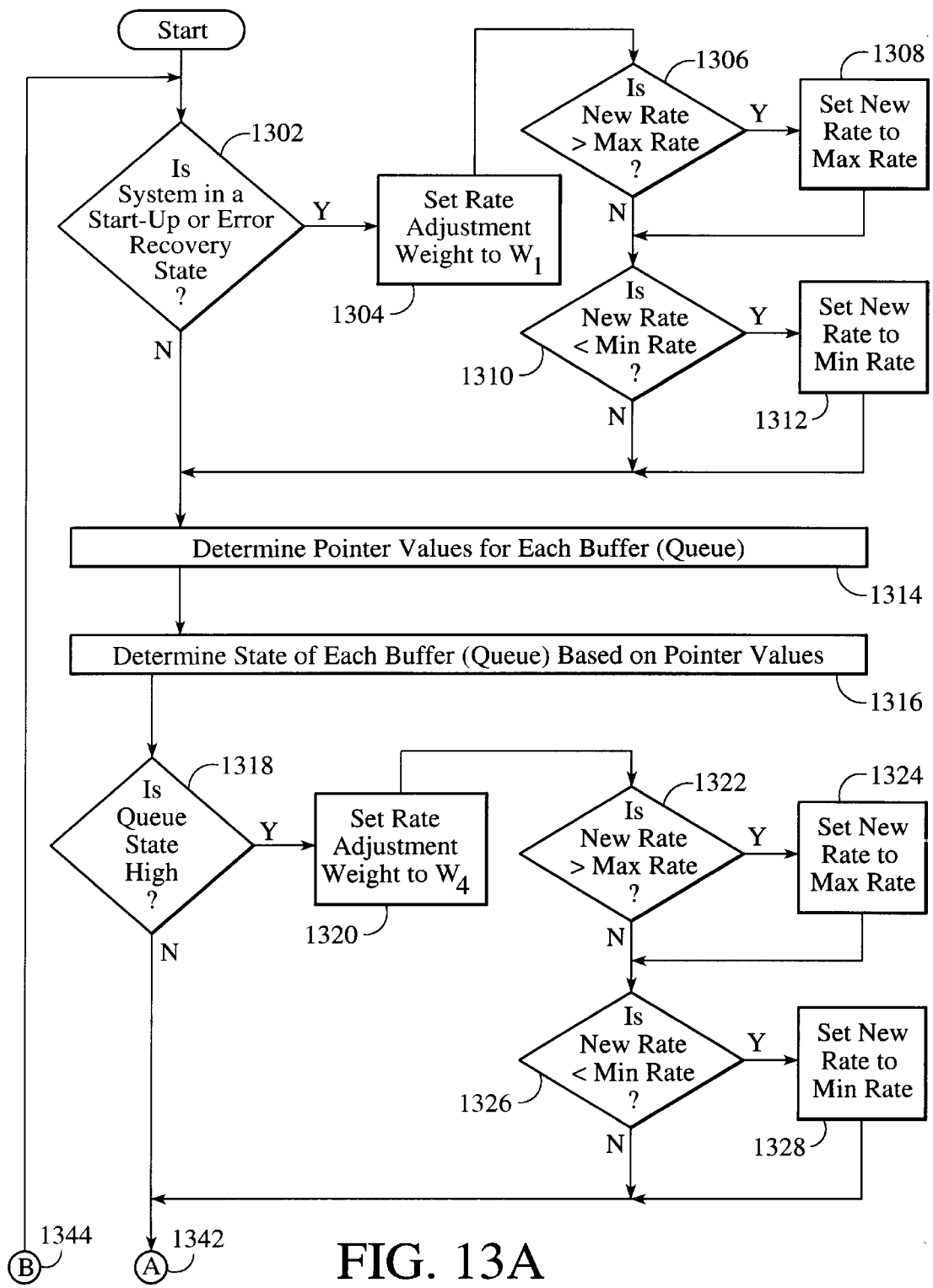
FIG. 13, which consists of FIGS. 13a and 13b, is flow diagram of the operation of the present invention.
Figure 13B:
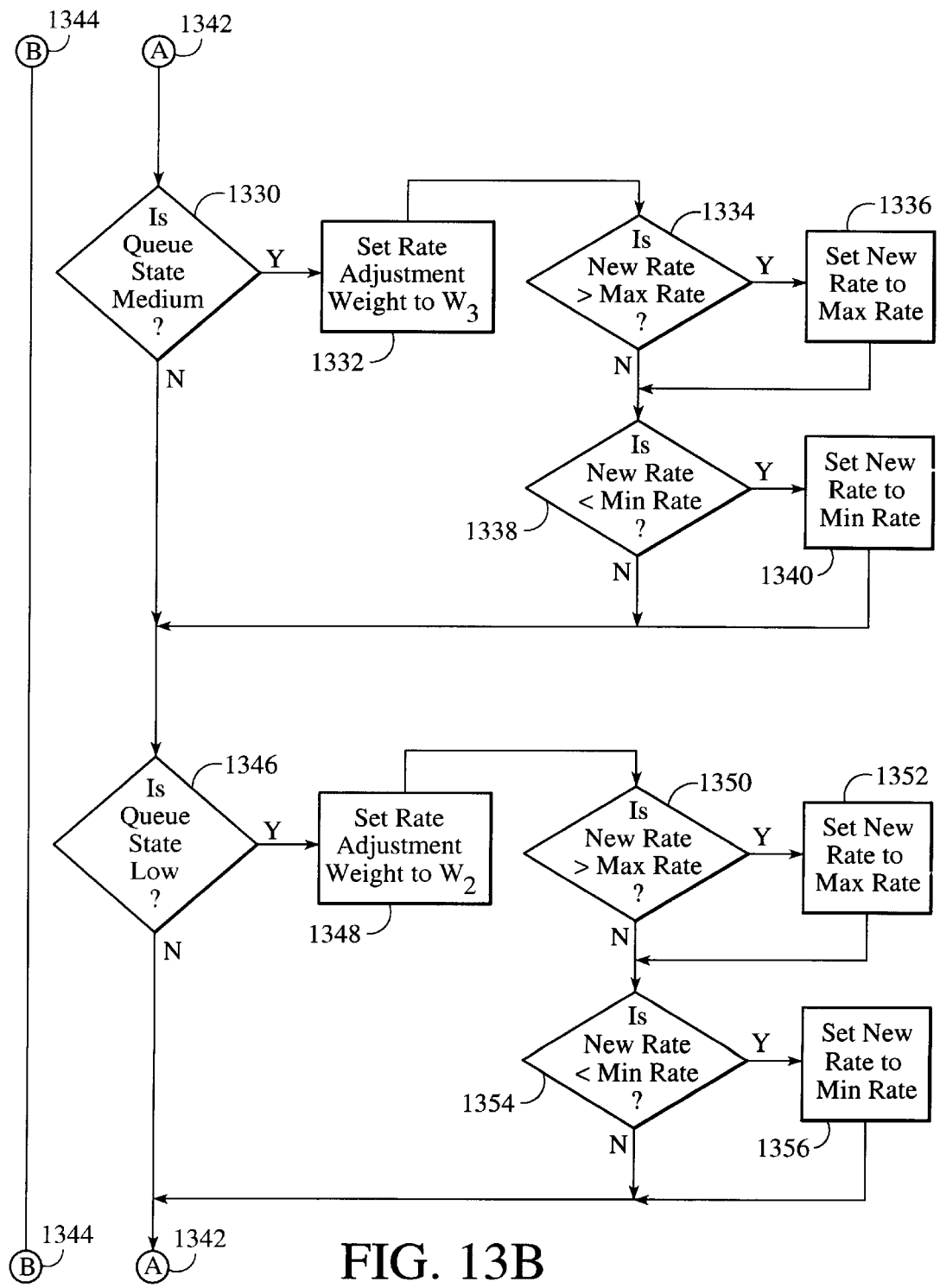
Figure 13C:
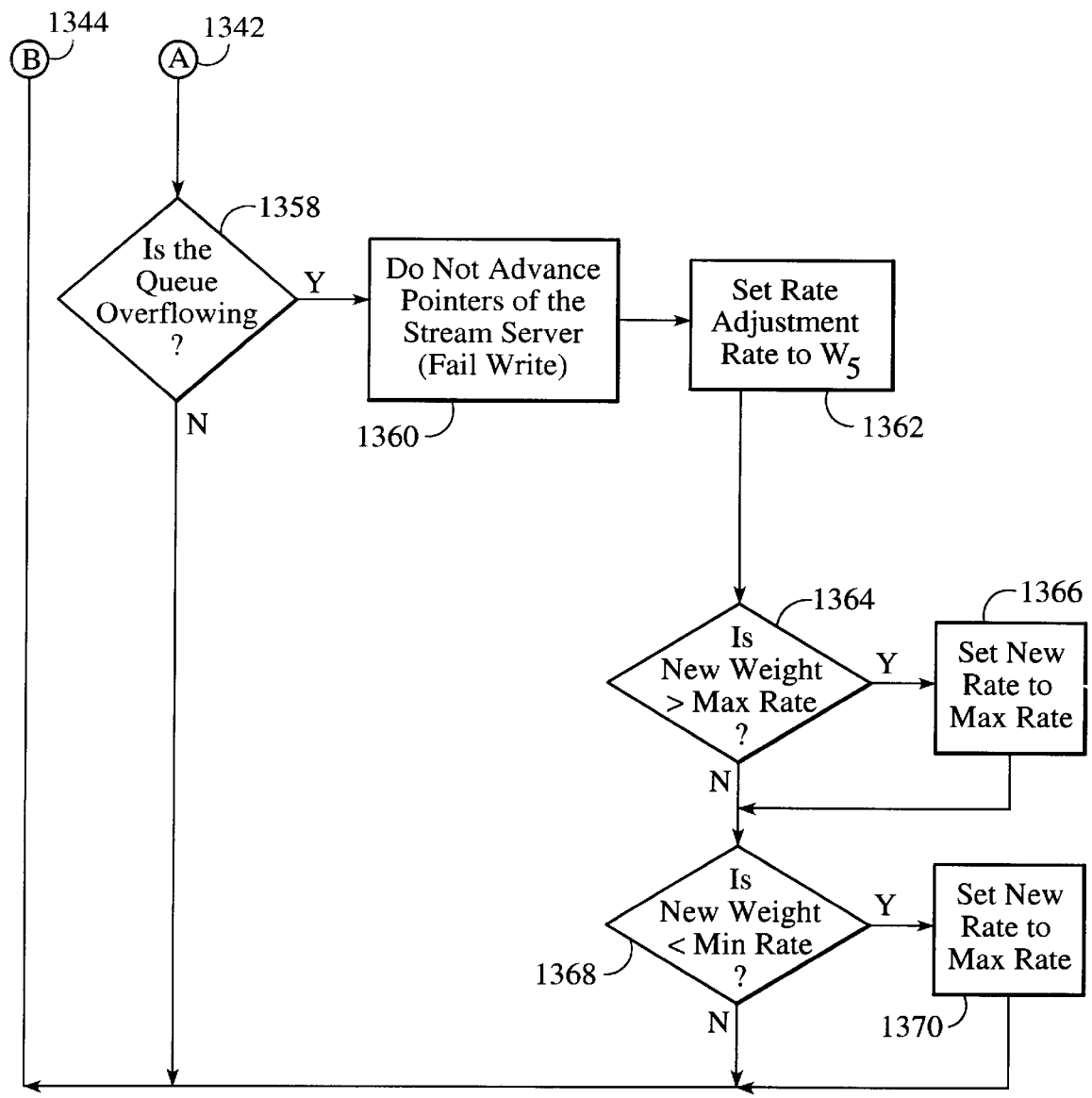

An example of the method of the present invention is illustrated by the flow diagram of FIG. 13, which consists of FIGS. 13a and 13b. In general, this method attempts to maintain the levels of each of the queues of the buffer memory 710 as close to the high-water mark 1204 as possible. Basically, for each buffer or queue of the buffer memory 710, the system interface card 530 determines whether the buffer level is low 1210, medium 1212, or high 1214 based on its pointer values 902 and 904. The buffer levels may also include overflow and underflow levels (not shown). In a preferred embodiment of the present invention, the stream server 502 makes this determination based on pointers 902 and 904 transmitted to it from the system interface card 530. Alternatively, the pump processor 708 may make the buffer level determination and transmit the buffer levels to the stream server 502 via the SCSI-2 fast and wide interface 702 of the system interface card 530 and the interface unit 814 of the stream server 502.

As shown in FIG. 8, the interface unit 814 provides the buffer levels (or pointers) to the rate adjustment module 818. Alternatively, the control processor 712 may determine the buffer levels and transmit the buffer levels to the stream server 502 via the back channel interface unit 816. The back channel interface unit 816 then provides the received buffer levels to the rate adjustment module 818.

In either case, the rate adjustment module 818, which may be implemented as a software program being executed by a processor, determines a rate adjustment weight value. The rate adjustment weight values directly affect an interval between fixed size transfers. Accordingly, a new or adjusted rate is inversely proportional to the rate adjustment weight value and proportional to the old rate. However, the new or adjusted rate is bounded by minimum and maximum rates, such as two (2) MBytes/sec and twelve (12) MBytes/sec, respectively, for example. The rate adjustment module 818 may also store one or more past buffer levels to determine trends (or trajectories) in the buffer levels.

Again, FIG. 13, which consists of FIGS. 13a and 13b, illustrates the details of a method 1300 of the present invention. Again, in general, this method attempts to maintain the levels of each of the queues of the buffer memory 710 as close to the high-water mark 1204 as possible. The method of the present invention accomplishes this as follows. As shown in step 1302, whether the system 500 is in a start-up or error recovery state is first determined. In such states, the buffer or queue level will be empty and the rate should be increased such that the high-water mark 1204 of the particular queue of the buffer memory 710 is reached as quickly as possible. Thus, as shown in step 1304, if the system 500 is in fact in a start-up or error recovery state, the rate adjustment weight is set to W1. In general, W1 is much less than 1, and may be 0.900 as shown in FIG. 14. Next, as shown in steps 1306 and 1308, if the new rate, which is a function of the present rate and W1, is greater than a predetermined maximum rate (e.g., twelve (12) MBytes/sec), the new rate is limited to the predetermined maximum rate. Next, as shown in steps 1310 and 1312, if the new rate is less than a predetermined minimum rate (e.g., two (2) MBytes/sec), the new rate is set to the predetermined minimum rate. Actually, steps 1310 and 1312 can typically be omitted since the new rate will always be greater than a present rate, which is presumably greater than the predetermined minimum rate.

Next, as shown in step 1314, for each queue of the buffer memory 710, the pointer values 902 and 904 are determined. As discussed above, this step is preferably performed by the rate adjustment module 818. Alternatively, this step may be performed by the pump microprocessor 708. The state of each queue (e.g., low, medium, or high) of the buffer memory 710 is then determined based on the corresponding pointer values. Again, this step is preferably performed by the rate adjustment module 818 but may be performed by the pump microprocessor 708.

In the remaining steps of the present invention, the rate adjustment weight is selected based on the state of the queue of the buffer memory 710. Specifically, as shown in steps 1318 and 1320, if the queue state is high 1214, the rate adjustment weight is set to W4. In general, W4 will be slightly greater than 1, such as 1.005 as shown in FIG. 14 for example. Next, as shown in steps 1322 and 1324, if the new rate, which is a function of the present rate and W4 is greater than the predetermined maximum rate, the new rate is limited to the predetermined maximum rate. Next, as shown in steps 1326 and 1328, if the new rate is less than the predetermined minimum rate, the new rate is set to the predetermined minimum rate. Actually, steps 1322 and 1324 can typically be omitted since the new rate will always be less than a present rate, which is presumably less than the predetermined maximum rate.

Next, as shown in steps 1330 and 1332, if the queue state is medium 1212, the rate adjustment weight is set to W3. In general, W3 will be slightly less than 1, such as 0.985 as shown in FIG. 14 for example. Next, as shown in steps 1334 and 1336, if the new rate, which is a function of the present rate and W3 is greater than the predetermined maximum rate, the new rate is limited to the predetermined maximum rate. Next, as shown in steps 1338 and 1340, if the new rate is less than the predetermined minimum rate, the new rate is set to the predetermined minimum rate. Actually, steps 1338 and 1340 can typically be omitted since the new rate will always be greater than a present rate, which is presumably greater than the predetermined minimum rate.

Step "A" 1342 defines the connection between the step 1330 of FIG. 13a and step 1346 of FIG. 13b. Step "B" 1344 defines the connection between the step 1302 of FIG. 13a and steps 1346, 1354, and 1356 of FIG. 13b. Next, as shown in steps 1346 and 1348, if the queue state is low 1210, the rate adjustment weight is set to W2. In general, W2 will be between W1 and W3, such as 0.950 as shown in FIG. 14 for example. Next, as shown in steps 1350 and 1352, if the new rate, which is a function of the present rate and W2 is greater than the predetermined maximum rate, the new rate is limited to the predetermined maximum rate. Next, as shown in steps 1354 and 1356, if the new rate is less than the predetermined minimum rate, the new rate is set to the predetermined minimum rate. Actually, steps 1354 and 1356 can typically be omitted since the new rate will always be greater than a present rate, which is presumably greater than the predetermined minimum rate.

An overflow condition may also be detected. As shown in steps 1358 and 1360, when the overflow condition is detected, the stream server's read pointers are not advanced in the source MPEG stream. Consequently, the previous transfer packet is re-transmitted. Thus, the overflow condition is the only condition in which a write truly fails. Moreover, as shown in step 1362, the rate adjustment weight is set to W5. In general, W5 will be much greater than 1, such as 1.050 as shown in FIG. 14 for example. Next, as shown in steps 1364 and 1366, if the new rate, which is a function of the present rate and W5 is greater than the predetermined maximum rate, the new rate is limited to the predetermined maximum rate. Next, as shown in steps 1368 and 1370, if the new rate is less than the predetermined minimum rate, the new rate is set to the predetermined minimum rate. Actually, steps 1368 and 1370 can typically be omitted since the new rate will always be greater than a present rate, which is presumably greater than the predetermined minimum rate.

What is claimed is:

1. In a system having a server, upto M*N decoders, each having a decoder buffer memory, and upto M expanders, each having a buffer memory partitioned into upto N queues, a method for transmitting encoded data from the server to one of the upto M*N decoders, the method comprising steps of:
    a) transmitting the encoded data from the server to the one of the upto M*N decoders, via one of the upto M expanders associated with the one of the upto M*N decoders, until its decoder buffer memory is filled to a predetermined level;
    b) transmitting, at a first rate, the encoded data from the server to one of the N queues of the buffer memory of the one of the upto M expanders associated with the one of the upto M*N decoders;
    c) determining a state of the one of the N queues of the buffer memory of the one of the upto M expanders; and
    d) adjusting the first rate at which the encoded data is transmitted from the server to the one of the N queues of the buffer memory of one of the upto M expanders associated with the one of the upto M*N decoders based on the state determined in step (c) to form an adjusted rate.

2. The method of claim 1 wherein the step of determining a state includes sub-steps of:
    i) determining a state of the one of the N queues of the buffer memory at the one of the upto M expanders, and
    ii) transmitting the determined state from the one of the upto M expanders to the server.

3. The method of claim 1 further comprising steps of:
    e) determining whether the adjusted rate is greater than a predetermined maximum rate;
    f) setting the adjusted rate to the predetermined maximum rate if it has been determined to be greater than the predetermined maximum rate in step (e);

g) determining whether the adjusted rate is less than a predetermined minimum rate; and h) setting the adjusted rate to the predetermined minimum rate if it has been determined to be less than the predetermined minimum rate in step (g).

4. The method of claim 1 further comprising steps of:

e) determining whether the system is in a start-up state; and f) setting the adjusted rate to a predetermined maximum rate if it has been determined that the system is in a start-up state.

5. A system for distributing encoded data, the system comprising:

a) a server for retrieving files of the encoded data and outputting streams of the encoded data at a determined rate;

b) an expander having an input receiving the streams of encoded data output by the server, a storage device for buffering the streams of encoded data received at the input of the expander, a first output for providing, upon request, the streams of encoded data buffered in the storage device, and a second output for providing storage device state data to the server, wherein the determined rate of the server is adjusted based on the storage device state data; and c) a plurality of decoders, each of the plurality of decoders having an input for receiving the streams of encoded data provided from the first output of the expander and an output for providing data requests to the expander.

6. The system of claim 5 wherein the storage device is segmented into a number of queues such that each of the plurality of decoders has an associated queue.

7. The system of claim 6 wherein the stream server directs the streams of the encoded data to a particular one of the number of queues of the storage device based on which of the plurality of decoders the stream is destined for.

8. The system of claim 5 wherein the input and second output of the expander share a common port.

9. The system of claim 8 wherein the input and second output of the expander are facilitated by a communications channel supporting the SCSI-2 fast and wide protocol.

10. The system of claim 5 wherein the expander includes:

i) a first interface defining the input of the expander;

ii) an internal bus, the internal bus being coupled with the first interface;

iii) a second interface defining the first output of the expander and being coupled with the internal bus;

iv) a first microprocessor, coupled with the internal bus, for moving the streams of encoded data received at the first interface to the storage device and for moving buffered data from the storage device to the second interface; and v) an arbiter for arbitrating access to the internal bus of the expander.

11. The system of claim 10 wherein the first microprocessor further determines the storage device state data and provides the storage device state data to the first interface via the internal bus.

12. The system of claim 6 wherein each of the plurality of decoders includes:

i) a transport demultiplexer having an input for accepting the stream of encoded data, and at least two outputs, the transport demultiplexer separating different types of encoded data from the stream of encoded data and providing these different types of encoded data to associated ones of the at least two outputs;

ii) a first memory device, associated with the transport demultiplexer, for buffering the stream of encoded data;

iii) a first decoder, having an input coupled with one of the at least two outputs of the transport demultiplexer, for decoding the encoded data provided to it; and iv) a second memory device, associated with the first decoder, for buffering the encoded data provided on the one of the at least two outputs of the transport demultiplexer, wherein, the second memory device is filled with the encoded data provided on the one of the at least two outputs of the transport demultiplexer before the first memory device is filled, to a predetermined level, with the stream of encoded data.

13. The system of claim 12 wherein a queue of the storage device of the expander is only filled when the first and second memory devices of the associated one of the plurality of decoders are filled to a predetermined level.

14. The system of claim 5 wherein the server includes:

i) a file storage device for storing files of the encoded data;

ii) a timing and control unit for accessing one of the files of the encoded data stored in the file storage device;

iii) a transfer buffer for buffering the one of the files of the encoded data stored on the file storage device and accessed by the timing and control unit;

iv) an interface unit for formatting data buffered in the transfer buffer for output, wherein the timing and control unit selects the determined rate at which data are requested by the interface unit from the transfer buffer; and v) a rate adjustment device for adjusting the determined rate based on the storage device state data.

15. The system of claim 5 wherein the expander includes:

i) a first interface defining the input of the expander;

ii) an internal bus, the internal bus being coupled with the first interface;

iii) a second interface defining the first output of the expander and being coupled with the internal bus;

iv) a first microprocessor, coupled with the internal bus, for moving the streams of encoded data received at the first interface to the storage device and for moving buffered data from the storage device to the second interface;

v) a second microprocessor, coupled with the internal bus, for determining the storage device state data;

vi) a control bus interface coupled with the internal bus; and vii) an arbiter for arbitrating access to the internal bus of the expander.

16. The system of claim 15 wherein the second microprocessor communicates the storage device state data to the stream server via the second output.

* * * * *